US012643214B2

(12) United States Patent
Chen et al.

(10) Patent No.: US 12,643,214 B2
(45) Date of Patent: Jun. 2, 2026

(54) POWER TOOL AND CONTROL METHOD THEREOF

(71) Applicant: Positec Power Tools (Suzhou) Co., Ltd., Suzhou (CN)

(72) Inventors: Jian Chen, Suzhou (CN); Liangbao Gong, Suzhou (CN); Wei Zhang, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 77 days.

(21) Appl. No.: 18/518,406

(22) Filed: Nov. 22, 2023

(65) Prior Publication Data

US 2024/0083006 A1 Mar. 14, 2024

Related U.S. Application Data

(63) Continuation of application No. PCT/CN2022/094599, filed on May 24, 2022.

(30) Foreign Application Priority Data

May 25, 2021 (CN) ......................... 202110573836.0
Dec. 30, 2021 (CN) ......................... 202111654021.1
Dec. 30, 2021 (CN) ......................... 202123431102.3

(51) Int. Cl.
*B25F 5/00* (2006.01)
*B25F 3/00* (2006.01)

(52) U.S. Cl.
CPC ................ *B25F 5/001* (2013.01); *B25F 3/00* (2013.01)

(58) Field of Classification Search
CPC ............. B25F 3/00; B25F 5/001; B23B 29/24
See application file for complete search history.

(56) References Cited

U.S. PATENT DOCUMENTS 4,536,688 A 8/1985 Roger
6,598,684 B2 7/2003 Watanabe
(Continued)

FOREIGN PATENT DOCUMENTS

CN 1579712 A 2/2005
CN 1765590 A 5/2006
(Continued)

OTHER PUBLICATIONS

First Office Action in CN application No. CN202110573836.0, dated Apr. 12, 2024.
(Continued)

*Primary Examiner* — Daniel Jeremy Leeds
(74) *Attorney, Agent, or Firm* — Lee & Hayes, P.C.

(57) ABSTRACT

This application relates to the field of power tool technologies, and specifically discloses a power tool and a control method thereof. The tool includes at least two output heads. An output head detection assembly can detect a position of an output head at a working position and generate a detection signal. The detection signal is associated with a working mode of the output head. A function switching unit generates, in response to external triggering, a mode switching signal used for indicating to switch the working mode of the output head at the working position. A controller is connected to the output head detection assembly and the function switching unit, switches the working mode of the output head at the working position in response to the mode switching signal, and associates the detection signal with a working mode after switching.

20 Claims, 10 Drawing Sheets

(56) References Cited

U.S. PATENT DOCUMENTS

| | | | | |
|---|---|---|---|---|
| 7,137,541 | B2 | 11/2006 | Baskar et al. | |
| 10,414,033 | B2 | 9/2019 | Ekstrom et al. | |
| 2003/0165365 | A1 | 9/2003 | Eriksen | |
| 2014/0284070 | A1 | 9/2014 | Ng et al. | |
| 2018/0215029 | A1 | 8/2018 | Steckel | |
| 2019/0009398 | A1* | 1/2019 | Zhong | B23B 45/02 |
| 2019/0308309 | A1* | 10/2019 | Gregorich | B23B 45/003 |
| 2021/0146523 | A1* | 5/2021 | Blatz | B24B 23/02 |

FOREIGN PATENT DOCUMENTS

| | | | |
|---|---|---|---|
| CN | 1898067 | A | 1/2007 |
| CN | 1942276 | A | 4/2007 |
| CN | 200991885 | Y | 12/2007 |
| CN | 101166598 | A | 4/2008 |
| CN | 201049399 | Y | 4/2008 |
| CN | 101204803 | B | 6/2008 |
| CN | 101342693 | B | 1/2009 |
| CN | 101396811 | A | 4/2009 |
| CN | 101511544 | B | 8/2009 |
| CN | 201537904 | U | 8/2010 |
| CN | 102581343 | A | 7/2012 |
| CN | 102581343 | B | 7/2012 |
| CN | 102892555 | B | 1/2013 |
| CN | 102935636 | B | 2/2013 |
| CN | 103909501 | A | 7/2014 |
| CN | 103963017 | B | 8/2014 |
| CN | 204603478 | U | 9/2015 |
| CN | 105283274 | A | 1/2016 |
| CN | 106041836 | A | 10/2016 |
| CN | 205685278 | U | 11/2016 |
| CN | 107283369 | A | 10/2017 |
| CN | 206918126 | U | 1/2018 |
| CN | 101195176 | B | 6/2018 |
| CN | 211992799 | U | 11/2020 |
| CN | 112518678 | A | 3/2021 |
| CN | 215548419 | U | 1/2022 |
| CN | 217372245 | U | 9/2022 |
| DE | 3916355 | A1 | 12/1989 |
| DE | 102019125171 | A1 | 3/2021 |
| EP | 2135711 | B1 | 12/2009 |
| EP | 2554306 | B1 | 2/2013 |
| EP | 3238880 | A1 | 11/2017 |
| JP | 2019209393 | A | 12/2019 |
| TW | I301427 | B | 10/2007 |
| WO | 2008028713 | A1 | 3/2008 |
| WO | WO2009049367 | A1 | 4/2009 |
| WO | WO2010110225 | A1 | 9/2010 |
| WO | WO2013104267 | A1 | 7/2013 |

OTHER PUBLICATIONS

First search in CN application No. CN202110573836.0, dated Apr. 12, 2024.

First Office Action in CN application No. CN202111654021.1 , dated Jul. 12, 2024.

First search in CN application No. CN202111654021.1, dated Jul. 12, 2024.

* cited by examiner

POWER TOOL AND CONTROL METHOD THEREOF

CROSS-REFERENCED TO RELATED APPLICATION

This application claims priority to and is a continuation of PCT Patent Application No. PCT/CN2022/094599 filed on May 24, 2022 and entitled "Electric Tool and Control Method Therefor," which claims priority to Chinese Application No. CN202123431102.3, filed on Dec. 30, 2021; Chinese Application No. CN202111654021.1, filed on Dec. 30, 2021; Chinese Application No. CN202110573836.0, filed on May 25, 2021, all of which are incorporated herein by reference in their entirety.

BACKGROUND

Technical Field

The present application relates to the field of power tool technologies, and in particular, to a power tool and a control method thereof.

Related Art

Double-head power tools or multi-head power tools are widely applied to machinery, construction, among other fields. A power tool includes at least two output heads. Therefore, different functions can be implemented by using different output heads without changing a tool body.

For example, two output heads are included. One output head implements a drilling function, and the other output head implements a screwdriver function. In a general operation process, when the drilling function needs to be used, the output head corresponding to the drilling function is adjusted to a working position, and then a drilling work accessory is changed for the output head. When the screwdriver function needs to be used, the output head corresponding to the screwdriver function is adjusted to the working position, and then a screwdriver working accessory is changed for the output head. However, the foregoing manner is complex, and once the output head at the working position does not correspond to a required working mode, it is usually necessary to frequently change working accessories or switch output heads, resulting in inconvenient operations and low use efficiency.

SUMMARY

In view of this, it is necessary to provide a power tool and a control method thereof for the foregoing problems.

The present application provides a power tool, comprising:

- at least two output heads, respectively selectively located a working position or a non-working position;
- an output head detection assembly is configured to detect an output head at the working position, and generate a detection signal, wherein the detection signal is associated with a working mode of the output head at the working position;
- a function switching unit, is configured to generate, in response to external triggering, a mode switching signal used for indicating to switch the working mode of the output head at the working position; and
- a controller, connected to the output head detection assembly and the function switching unit, the controller is configured to switch the working mode of the output head at the working position in response to the mode switching signal, and associate the detection signal with the working mode after switching.

In one of the embodiments, wherein the power tool further comprises:

- an output head switching unit, respectively connected to the output heads, and switching the output head at the working position in response to external triggering, to change the detection signal of the output head detection assembly, wherein the controller is configured to switch the working mode of the output head at the working position in response to a change in the detection signal.

In one of the embodiments, wherein the output head detection assembly comprises a detection element, and the detection element comprises a Hall sensor, a light sensor or a proximity sensor.

In one of the embodiments, wherein the function switching unit is further configured to generate, in response to external triggering, a torque switching signal used for indicating to switch a working torque of the output head at the working position, and the controller is configured to switch the working torque of the output head at the working position in response to the torque switching signal.

In one of the embodiments, wherein the function switching unit comprises a first switching region and a second switching region, the working mode of the output head at the working position comprises a first mode and a second mode, and the first switching region and the second switching region respectively correspond to the first mode and the second mode.

In one of the embodiments, wherein the first switching region comprises a first button, and the first button is configured to generate the mode switching signal in response to external triggering, to switch the working mode of the output head at the working position to the first mode; and the second switching region comprises a second button, and the second button is configured to generate the mode switching signal in response to external triggering, to switch the working mode of the output head at the working position to the second mode.

In one of the embodiments, wherein the first button is further configured to generate a torque switching signal in response to external triggering, to change a working torque of the output head at the working position.

In one of the embodiments, wherein the function switching unit comprises a display region, used for displaying a current torque.

In one of the embodiments, wherein the function switching unit further comprises an indicator lamp corresponding to working modes, and the indicator lamp is used for indicating the working mode of the current output head at the working position.

In one of the embodiments, wherein the controller is further used for reading a prestored working association state after the power tool is powered up, and the working association state is used for representing an association relationship between the detection signal and the working mode.

In one of the embodiments, wherein the controller further obtains a current detection signal and the working mode of the current output head at the working position in response to stopping of the power tool, and stores a working association state, wherein the working association state is used for representing an association relationship between the detection signal and the working mode.

In one of the embodiments, wherein the controller determines, in response to detecting that a working state parameter of the power tool satisfies a preset value, that the power tool stops, and the working state parameter comprises at least one of a voltage, a current, a temperature, a motor rotation speed, and motor stop duration.

In one of the embodiments, wherein the working mode comprises a screwdriver mode and a drill mode.

The present application further provides a control method of a power tool, wherein the power tool comprises at least two output heads, and the control method comprises:

- detecting an output head at a working position, and generating a detection signal, wherein the detection signal is associated with a working mode of the output head at the working position, and in response to different output heads being located at the working position, corresponding detection signals are different;
- generating, in response to external triggering, a mode switching signal used for indicating to switch the working mode of the output head at the working position; and
- switching the working mode of the output head at the working position in response to the mode switching signal, and associating the detection signal with the working mode after switching.

In one of the embodiments, wherein the control method further comprises:

- in response to a power-up being detected, reading a prestored working association state, wherein the working association state is used for representing an association relationship between the detection signal and the working mode;
- determining the working mode of the output head at the working position according to the detection signal and the working association state; and
- switching the working mode of the output head at the working position in response to the mode switching signal, associating the detection signal with the working mode after switching, and updating the working association state.

In one of the embodiments, wherein the method further comprises: controlling an indicator lamp to be turned on, to indicate the working mode of the output head at the working position.

In one of the embodiments, wherein the method further comprises:

- in response to determining that the power tool stops, determining a current detection signal and the working mode of the output head at the working position; and
- storing the working association state.

In one of the embodiments, wherein the detection signal comprises a first signal and a second signal, and the working mode comprises a first mode and a second mode; and

- the working association state comprises: the first signal corresponds to the first mode, and the second signal corresponds to the second mode; or the first signal corresponds to the second mode, and the second signal corresponds to the first mode.

In one of the embodiments, wherein the first mode is a screwdriver mode, and the second mode is a drill mode.

In one of the embodiments, wherein the method further comprises: in response to determining that the working mode of the output head at the working position is the first mode, and detecting a torque switching signal corresponding to the first mode, controlling to switch a working torque of the output head at the working position.

In one of the embodiments, wherein the method further comprises: in response to determining that the working mode of the output head at the working position is the first mode, controlling a display region to be turned on, to indicate a working torque of the output head at the working position.

In one of the embodiments, wherein the method further comprises:

- in response to determining that the power tool stops, storing a working torque in the first mode.

In one of the embodiments, wherein the method further comprises:

- detecting a working state parameter of the power tool; and
- in response to the working state parameter satisfying a preset condition, determining that the power tool stops, wherein the working state parameter comprises at least one of a voltage, a current, a temperature, a motor rotation speed, and motor stop duration.

In the foregoing power tool, the output head detection assembly detects the output head at the working position and generates a corresponding detection signal. The function switching unit generates a mode switching signal in response to external triggering. The mode switching signal is used for indicating to switch the working mode of the output head at the working position. The controller switches the working mode of the output head at the working position in response to the mode switching signal, and can associate the detection signal corresponding to the output head at the working position with a working mode after switching. In other words, one same output head may have a plurality of working modes. When one same output head is at the working position, the working mode of the output head may be switched by using the function switching unit, and the working mode after switching is associated with a current detection signal. Because detection signals correspond one to one to positions of output heads, it is implemented that the working mode after switching is associated with and matches a current output head at the working position. In this way, switching of working modes can be implemented without switching output heads, and it is ensured that an output head at a working position accurately corresponds to a required working mode, so that operations are simplified, thereby effectively improving use efficiency and use convenience of the power tool.

The present application further provides a power tool, wherein the power tool comprises:

- a housing, comprising a main housing extending along a longitudinal axis and a handle housing at an angle with respect to the main housing, wherein a position opposite to a connecting position between the main housing and the handle housing is defined as a top of the main housing;
- a motor, disposed in the main housing;
- a switch trigger, disposed at the handle housing, and used for controlling start and stop of the motor;
- an output shaft, driven by the motor to rotate;
- a working assembly, wherein the working assembly comprises a first output head and a second output head, and the first output head and the second output head are selectively mated to the output shaft; and
- a control apparatus, wherein the control apparatus comprises a function switching unit and a controller electrically connected to the function switching unit; the function switching unit is disposed at the top of the main housing and is configured to generate a mode switching signal in response to external triggering, the controller switches, according to the received mode switching signal, a working mode of the output head mated to the output shaft, to set the power tool to a drill mode or a screwdriver mode; and in response to the power tool being in the drill mode, the output head mated to the output shaft outputs a constant torque, and in response to the power tool being in the screwdriver mode, an output torque of the output head mated to the output shaft is adjustable in a preset range.

In one of the embodiments, an operation button is disposed at the connecting position between the main housing and the handle housing, and the switch trigger is disposed adjacent to the operation button; and the operation button is used for releasing position locking of the output head relative to the main housing, so that a hand of an operator holding the handle housing selectively triggers the operation button or the trigger switch.

In one of the embodiments, wherein an operation button is disposed at the connecting position between the main housing and the handle housing, and the switch trigger is disposed adjacent to the operation button; and the operation button is used for releasing position locking of the output head relative to the main housing.

In one of the embodiments, wherein the power tool comprises a gear transmission mechanism that is disposed between the motor and the output shaft and a shift position adjustment member that is movable between a first position and a second position relative to the main housing to adjust different rotation speeds of the output shaft, and the shift position adjustment member is located at the top of the main housing and is close to the gear transmission mechanism.

In one of the embodiments, wherein the function switching unit comprises at least one button, and the button is used for operably switching the working mode of the power tool between the drill mode and the screwdriver mode.

In one of the embodiments, wherein the power tool further comprises a torque adjustment member electrically connected to the controller, and the torque adjustment member is used for operably adjusting the output torque of the output head mated to the output shaft in the screwdriver mode.

In one of the embodiments, wherein the power tool further comprises a torque adjustment member electrically connected to the controller; the function switching unit comprises a first button, and the first button is used for operably switching the working mode of the power tool to the screwdriver mode; and in the screwdriver mode, the first button is further used as the torque adjustment member for adjusting the output torque of the output head mated to the output shaft.

In one of the embodiments, wherein the function switching unit further comprises a second button, and the second button is used for operably switching the working mode of the power tool to the drill mode; and the first button and the second button are disposed in parallel.

In one of the embodiments, wherein marks or patterns representing the working modes are respectively disposed on the first button and the second button.

In one of the embodiments, wherein the power tool further comprises a first working indicator lamp corresponding to the first button and a second working indicator lamp corresponding to the second button; in response to the power tool being in the drill mode, the first working indicator lamp is on; and in response to the power tool being in the screwdriver mode, the second working indicator lamp is on.

In one of the embodiments, wherein the power tool further comprises a display region electrically connected to the controller, and the display region is used for displaying a set torque of the output head mated to the output shaft in the screwdriver mode.

In the foregoing power tool, the function switching unit generates a mode switching signal in response to external triggering. The mode switching signal is used for indicating to switch the working mode of the output head at the working position. The controller switches the working mode of the output head at the working position in response to the mode switching signal. When the power tool is switched to the drill mode, the output head at the working position, in other words, the output head mated to the output shaft outputs a constant torque. When the power tool is switched to the screwdriver mode, the output torque of the output head mated to the output shaft is adjustable in a preset range. The function switching unit may include a button used for switching working modes, or may include a torque adjustment member used for adjusting a torque, or may include a button integrating switching of working modes and torque adjustment, so that a function switching interface is more conducive to operations by a user, thereby improving convenience.

The present application further provides a power tool. The power tool includes:

- a housing;
- a motor, where the motor is disposed in the housing;
- an output shaft, where the motor drives the output shaft to rotate;
- a working assembly, where the working assembly includes at least two output heads, and the output heads are selectively located at a working position mated to the output shaft; and
- a control apparatus, where the control apparatus includes a function switching unit and a controller electrically connected to the function switching unit; corresponding to any output head at the working position, the function switching unit operably switches the power tool between a drill mode and a screwdriver mode; the function switching unit is capable of generating, in response to external triggering, a mode switching signal used for indicating to switch a working mode of the output head at the working position; the controller sets the power tool to the drill mode or the screwdriver mode in response to the mode switching signal; and when the power tool is in the drill mode, the output head at the working position outputs a constant torque, and when the power tool is in the screwdriver mode, an output torque of the output head at the working position is adjustable in a preset range.

In one of the embodiments, the power tool further includes a torque adjustment member electrically connected to the controller, when the power tool is switched to the screwdriver mode, the torque adjustment member is activated, and the torque adjustment member operably sets the output torque of the output head in the preset range.

In one of the embodiments, the power tool further includes a display region electrically connected to the torque adjustment member, and the display region is used for displaying the output torque set by the torque adjustment member.

In one of the embodiments, the power tool includes a gear transmission mechanism that is disposed between the motor and the output shaft and a shift position adjustment member that is movable between a first position and a second position relative to the housing; when the power tool is in the drill mode and the shift position adjustment member is at the first position, the gear transmission mechanism has a first transmission ratio, and the output head at the working position can output a first constant rotation speed; and when the power tool is in the drill mode and the shift position adjustment member is at the second position, the gear transmission mechanism has a second transmission ratio, and the output head at the working position can output a second constant rotation speed.

In one of the embodiments, the control apparatus further includes a detection apparatus used for detecting the shift position adjustment member, the detection apparatus is electrically connected to the controller, when the shift position adjustment member is at the first position, the detection apparatus sends a first detection signal, when the shift position adjustment member is at the second position, the detection apparatus sends a second detection signal, and the first detection signal is different from the second detection signal.

In one of the embodiments, when the power tool is in the drill mode, the controller controls the motor according to the first detection signal to output a first constant torque, controls the motor according to the second detection signal to output a second constant torque, and the first constant torque is different from the second constant torque; and when the power tool is in the screwdriver mode, the controller controls, according to the first detection signal, the output torque of the motor to be adjustable in a first preset range, controls, according to the second detection signal, the output torque of the motor to be adjustable in a second preset range, and the first preset range is different from the second preset range.

In one of the embodiments, the power tool further includes a detection element electrically connected to the controller, the detection element includes a first detection element that is disposed in the housing and a second detection element that is disposed in the working assembly, the working assembly is rotatably disposed relative to the housing, when one of the output heads rotates to a preset position relative to the housing, the first detection element and the second detection element interact and generate an electrical signal, and the controller matches a preset working mode for the power tool according to the electrical signal.

In one of the embodiments, the detection element includes a Hall sensor, a light sensor or a proximity sensor.

In one of the embodiments, the detection element is disposed as a non-contact switch, the first detection element is one of a magnet and a Hall element, and the second detection element is the other one of the magnet and the Hall element; when one of the output heads rotates to the preset position relative to the housing, the Hall element and the magnet generate a sensing signal; when one of the output heads rotates to a first preset position relative to the housing, the Hall element and the magnet generate a first sensing signal, and the controller controls the power tool to be in one of the drill mode and the screwdriver mode; and when one of the output heads rotates to a second preset position relative to the housing, the Hall element and the magnet generate a second sensing signal, and the controller controls the power tool to be in the other one of the drill mode and the screwdriver mode.

In one of the embodiments, the function switching unit includes a signal sensing member and at least one triggering member, the signal sensing member is electrically connected to the controller, and the triggering member operably triggers the signal sensing member to transmit the mode switching signal to a control board.

In one of the embodiments, the control apparatus further includes an indication member, the indication member is electrically connected to the controller, the indication member is used for indicating a working mode that the power tool is currently in, the indication member includes a first indication member and a second indication member, when the power tool is in the drill mode, the first indication member is in a working state, and when the power tool is in the screwdriver mode, the second indication member is in the working state.

DETAILED DESCRIPTION

Figure 1:
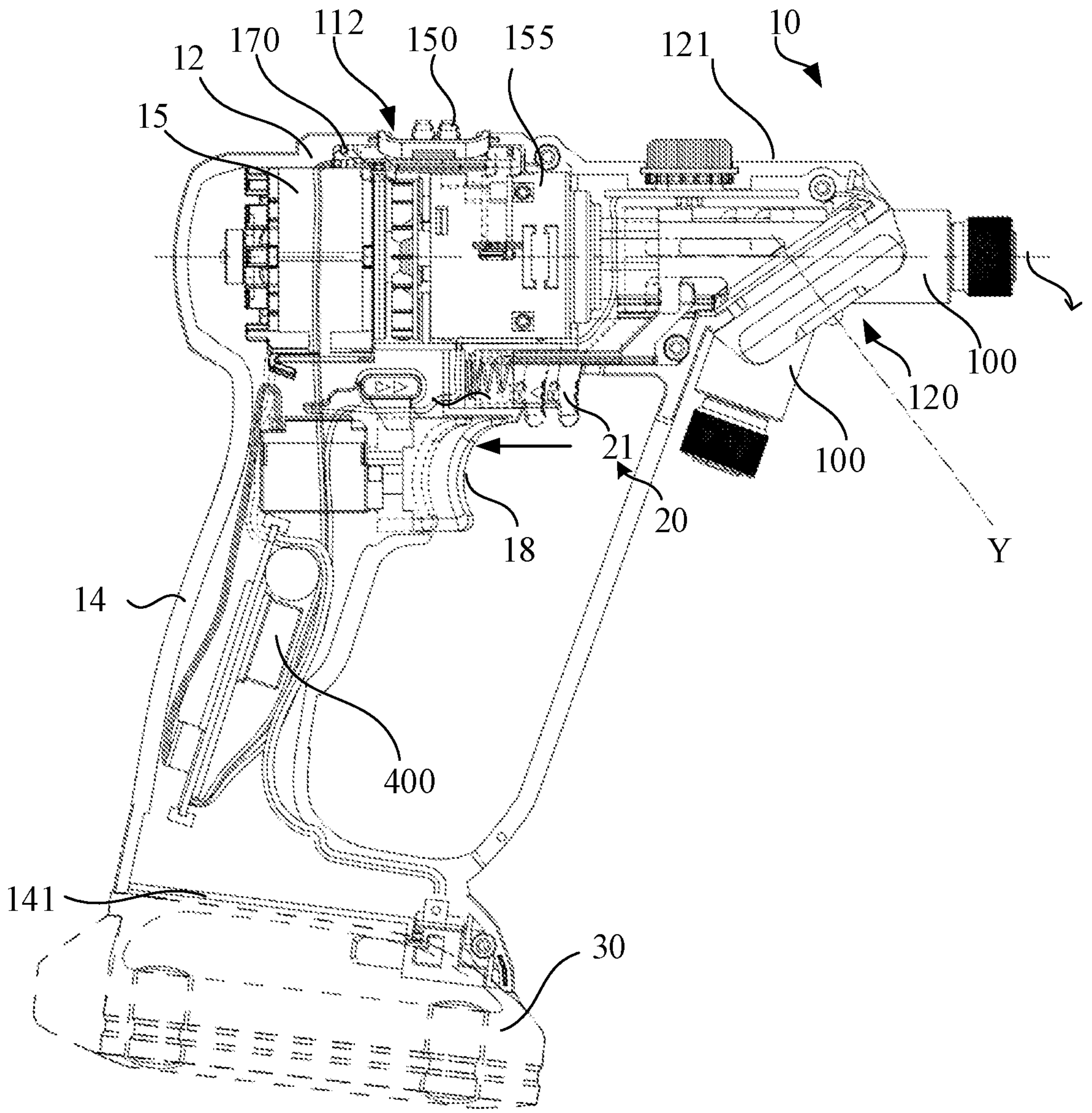
FIG. 1 is a schematic structural diagram of a power tool according to an embodiment of this application.

To facilitate understanding of the present application, the present application is described more fully below with reference to the related accompanying drawings. Preferred implementations of the present application are given in the accompanying drawings. However, the present application may be implemented in many different forms and is not limited to the implementations described herein. Rather, these implementations are provided for the purpose of providing a more thorough and comprehensive understanding of the disclosure of the present application.

In the present application, unless otherwise explicitly specified or defined, the terms such as “mount”, “install”, “connect”, “connection”, and “fixed” should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components or mutual interaction relationship between two components unless otherwise explicitly defined. Persons of ordinary skill in the art may understand the specific meanings of the foregoing terms in the present application according to specific situations.

It should be understood that orientation or position relationships indicated by the terms such as “center”, “longitudinal”, “transverse”, “length”, “width”, “thickness”, “on”, “below”, “front”, “back”, “left”, “right”, “vertical”, “horizontal”, “top”, “bottom”, “inside”, “outside”, “clockwise”, “anticlockwise”, “axial”, “radial”, and “circumferential” are based on orientation or position relationships shown in the accompanying drawings, and are used only for ease of description of the present application and brevity of description, rather than indicating or implying that the mentioned apparatus or component must have a particular orientation or must be constructed and operated in a particular orientation. Therefore, such terms should not be construed as limiting of the present application.

Terms “first” and “second” are used merely for the purpose of description, and shall not be construed as indicating or implying relative importance or implying a quantity of indicated technical features. Therefore, a feature restricted by “first” or “second” may explicitly indicate or implicitly include at least one of such features. In the descriptions of the present application, unless explicitly specified, “multiple” means at least two, for example, two or three.

Unless otherwise defined, meanings of all technical and scientific terms used herein are the same as that usually understood by persons skilled in the technical field to which the present application belongs. Terms used in the specification of the present application are merely intended to describe objectives of the specific embodiment, and are not intended to limit the present application. A term “and/or” used herein includes any or all combinations of one or more related listed items.

As described in the prior art, to enrich functions of power tools, double-head power tools or multi-head power tools have been widely applied. A double-head power tool is used as an example, one output head is used for implementing a drilling function, and the other output head is used for implementing a screwdriver function. When a working mode needs to be switched, an output head at a working position is usually switched, to switch an output head corresponding to a required working mode to the working position, and then a corresponding working accessory is changed for the output head. In this way, an entire switching process is completed. However, it is complex to implement the foregoing switching process, and once the output head at the working position does not correspond to a required working mode, it is usually necessary to frequently change working accessories or switch output heads.

For example, in Scenario 1, after a working accessory is mounted, if it is found that the working accessory is inconsistent with a working mode corresponding to a current output head, normal work cannot be performed, and a working accessory needs to be mounted again before normal work can be performed.

In Scenario 2, when holes with different sizes need to be drilled or screws with different models need to be turned, in other words, working accessories with different dimensions need to be used in one same working mode, drill working accessories or screwdriver working accessories need to be mounted on both output heads. It is assumed that an output head 1 corresponds to a drill mode and an output head 2 corresponds a screwdriver mode, and a requirement is to drill two holes with different dimensions in the drill mode. Therefore, drill working accessories with different dimensions are respectively mounted on the output head 1 and the output head 2. After the first hole is drilled with the output head 1, the second hole needs to be drilled with the output head 2. However, when the output head is switched to the output head 2, a working mode of the output head is correspondingly changed into the screwdriver mode, which is inconsistent with the required drill mode. Therefore, it is necessary to repeatedly change drill working accessories with different dimensions on the output head 1 before holes with different dimensions can be drilled.

In Scenario 3, switching needs to be performed between different working modes, an output head at a working position needs to be switched first to implement switching of working modes, and then a working accessory needs to be mounted on the output head at the working position. In this way, a requirement can be implemented, and operations are complex.

In Scenario 4, a working mode corresponding to each output head is not unique. A dial is used to adjust a torque and switch modes. However, repeated operations need to be performed between maximum torques and different torques, so that modes can be changed, and operations are complex.

As can be learned in combination with the several scenarios listed above, the use of a double-head or multi-head power tool at present is still complex and inconvenient, and use efficiency is low.

To resolve the foregoing problems, embodiments of this application provide a power tool and a control method thereof.

Figure 2A:
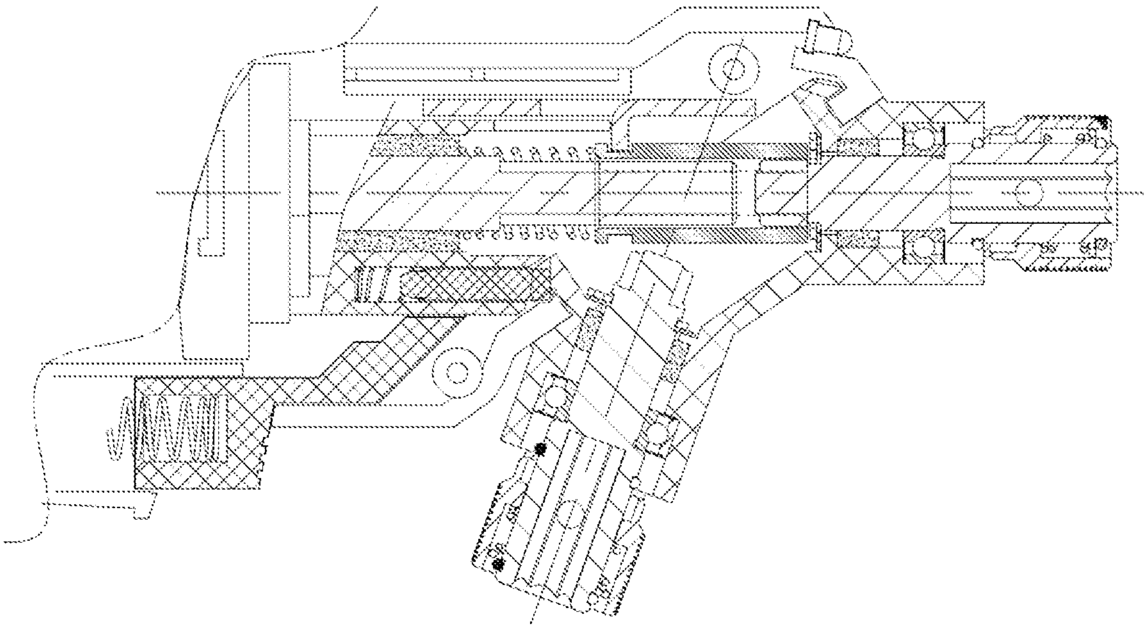
FIG. 2*a* is a structural cross-sectional view of a power tool during mating in an embodiment.

The power tool provided in the embodiments of this application may be a power tool such as an electric drill, an electric hammer, or the like. Referring to FIG. 1 and FIG. 2*a*, in an embodiment, a power tool 10 includes a main housing 12 and a handle housing 14 disposed at an angle with respect to the main housing. A motor 15 is disposed in the main housing 12. The main housing 12 extends in a vertical direction and has a longitudinal axis X. A 90-degree right angle or an obtuse angle greater than 90 degrees and less than 120 degrees is approximately formed between the handle housing 14 and the main housing 12. A battery pack mounting seat 141 is disposed at a tail end portion of the handle housing 14, and is used for being detachably connected to a rechargeable battery pack 30. The motor 15 drives an output shaft 130 to rotate.

A working assembly 120 includes at least two output heads 100 and an output head switching member. The output heads 100 are selectively located at a working position mated to the output shaft 130, and may be locked to or unlocked from relative to the main housing 12. Specifically, the working assembly 120 may rotate from an unlocking position around a pivotal axis Y relative to the main housing 12, to enable a selected output head to reach the working position. In other words, the output head 100 is selectively located at the working position mated to the output shaft 130, or located at a non-working position detached from the output shaft 130. The output head 100 is alternately mated to the output shaft 130. The output shaft 130 may select to connect to different types of working parts such as a drill bit and a screwdriver bit as required.

A trigger switch 18 is disposed at a position of the handle housing 14 close to the main housing 12, and is electrically connected to a controller 400 disposed in the handle housing 14. The trigger switch 18 may be used for activating the controller 400 and/or start the motor 15.

An operation button 21 is disposed at a connecting position between the main housing 12 and the handle housing 14. The operation button 21 is disposed adjacent to the trigger switch 18, so that a hand of an operator holding the handle housing 14 selectively triggers the operation button 21 or the trigger switch 18. The operation button 21 is used for releasing position locking of the working assembly 120 relative to the main housing 12.

Solid lines and dash lines in the figure respectively show schematic positions of movements of the trigger switch 18 and the operation button 21. In other words, movement directions of the trigger switch 18 and the operation button 21 are both consistent with a direction of the longitudinal axis X of the main housing 12, which meets operation habits of a user. Specifically, the trigger switch 18 starts the motor 15 to translate in a direction away from the working assembly 120 as shown by the arrow in the figure. That the operation button 21 unlocks the working assembly 120 relative to the main housing 12 is the translation in the direction away from the working assembly 120.

Referring to FIG. 1 and FIG. 2*a*, the power tool 10 includes a gear transmission mechanism 155 that is disposed between the motor 15 and the output shaft 130, and a high-low speed shift position adjustment member 150 that is movable between a first position and a second position relative to the main housing 12, to change a transmission manner of gears in the gear transmission mechanism 155 to change a reduction ratio, thereby making adjustments to obtain different rotation speeds of the output shaft. The high-low speed shift position adjustment member 150 is located at a top 121 of the main housing and is close to the gear transmission mechanism 155.

An illumination lamp 160 is disposed at an end of the main housing 12 close to the working assembly 120. The illumination lamp 160 is disposed as an LED, and is lit when the trigger switch 18 powers up the motor 15, and is turned off after a delay as the trigger switch 18 is powered off.

Figure 3:
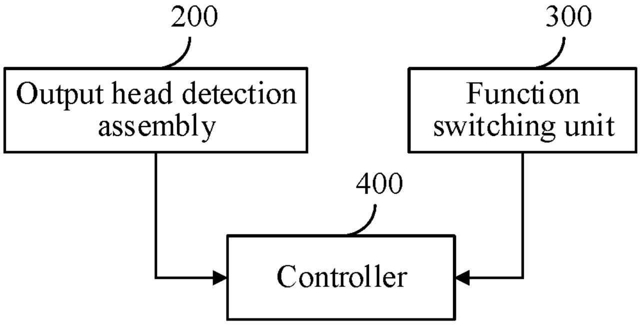
FIG. 3 is a diagram of function switching modules of a power tool according to an embodiment of this application.
Figure 4:
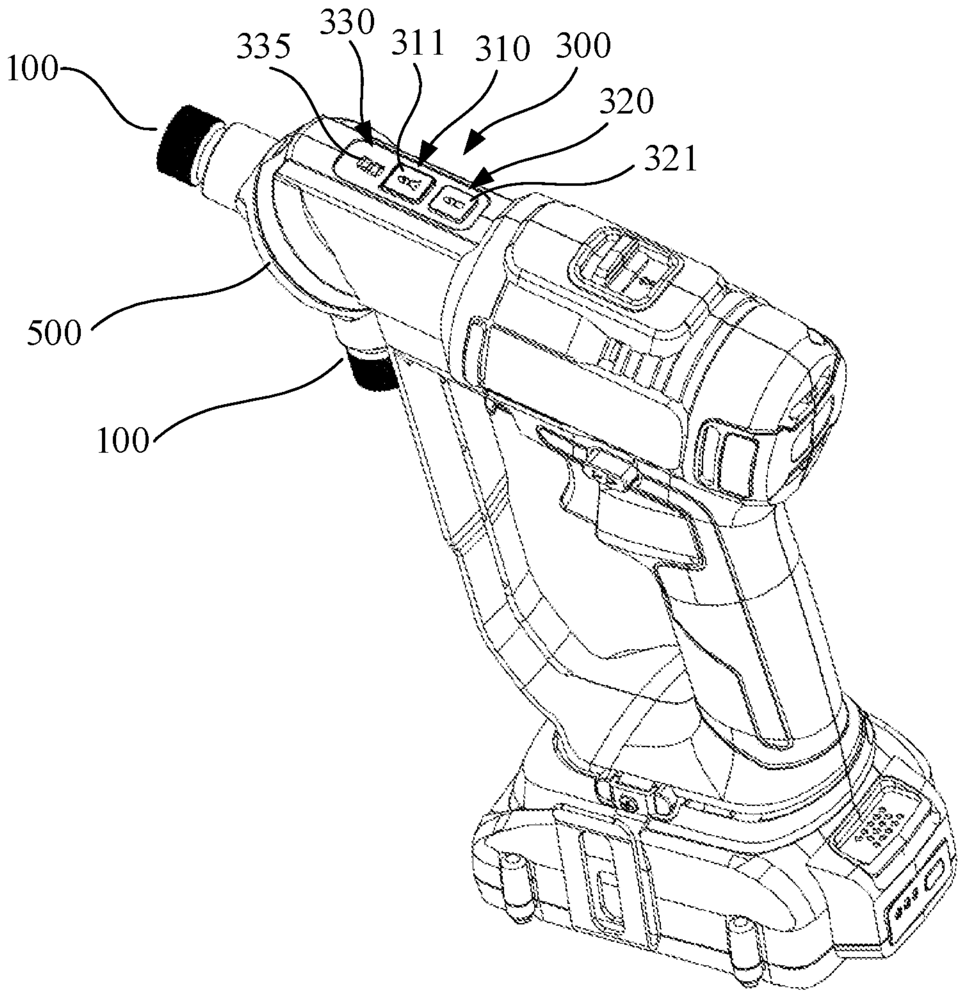
FIG. 4 is a schematic structural diagram of a power tool according to an embodiment of this application.

Referring to FIG. 3 and FIG. 4, in this embodiment, the power tool further includes an output head detection assembly 200, a function switching unit 300, and a controller 400.

The output head detection assembly 200 is disposed at a preset position, and is used for detecting an output head 100 at a working position and generating a detection signal. When different output heads 100 are located at the working position, corresponding detection signals are different, and the detection signals are associated with working modes of the output heads. Specifically, the detection signal generated by the output head detection assembly 200 changes as a position of the output head 100 changes. For example, when the output head 100 at the working position is an output head a, the detection signal is A. When the output head 100 at the working position is an output head b, the detection signal is B. In this way, it may be deduced, according to a detection signal, whether a current output head 100 located at the working position is the output head a or the output head b.

A position opposite to a connecting position between the main housing 12 and the handle housing 14 is defined as the top 121 of the main housing 12. The function switching unit 300 is disposed at the top 121 and is close to the working assembly 120.

The function switching unit 300 can generate, in response to external triggering, a mode switching signal used for indicating to switch the working mode of the output head 100 at the working position. Specifically, the function switching unit 300 may be triggered by a user. Through triggering, the function switching unit 300 may generate a corresponding mode switching signal and send the mode switching signal to the controller 400. For example, the power tool has a total of two working modes. A current output head 100 at the working position is in a working mode 1. When the function switching unit 300 is triggered, the working mode 1 may be switched to a working mode 2. In other words, the current output head 100 at the working position is controlled to enter the working mode 2. It should be noted that, in this case, it is not necessary to adjust the output head 100 to switch a working mode in a conventional manner, and the working mode of the current output head 100 at the working position may be switched by directly triggering the function switching unit 300.

The controller 400 is connected to the output head detection assembly 200 and the function switching unit 300, can switch the working mode of the output head 100 at the working position in response to the mode switching signal, and can associate the detection signal with a working mode after switching. Specifically, after receiving the mode switching signal generated by the function switching unit 300, the controller 400 correspondingly associates the detection signal that is currently detected by the output head detection assembly 200 and a working mode after switching. Because the detection signal may represent the current output head 100 at the working position. Therefore, the controller 400 actually makes the current output head 100 at the working position correspond to the working mode after switching. It is assumed that the current output head 100 at the working position is the output head a, an initial working mode of the output head is the working mode 1. When a user triggers the function switching unit 300, the working mode 1 may be switched to the working mode 2. The controller 400 associates the output head a with the working mode 2. The output head a may operate in the working mode 2.

It needs to be noted that an operable input manner of the function switching unit 300 may be a mechanical input or may be a touchscreen input. When the function switching unit 300 is a mechanical input, an operator may input a corresponding mode switching signal in a manner such as a manual press, a swipe, a spin, or the like, to trigger the controller 400 to perform a control output.

In the foregoing power tool, the output head detection assembly 200 detects the output head 100 at the working position and generates a corresponding detection signal. The function switching unit 300 generates a mode switching signal in response to external triggering. The mode switching signal is used for indicating to switch the working mode of the output head 100 at the working position. The controller 400 switches the working mode of the output head 100 at the working position in response to the mode switching signal, and associates a current detection signal with a working mode after switching. In other words, one same output head 100 may have a plurality of working modes. When one same output head 100 is at the working position, the working mode of the output head may be switched by using the function switching unit 300, and the working mode after switching is associated with a current detection signal. Because detection signals correspond one to one to positions of output heads 100, it is implemented that the working mode after switching is associated with and matches a current output head 100 at the working position. In this way, switching of working modes can be implemented without switching output heads 100, and it is ensured that an output head 100 at a working position accurately corresponds to a required working mode, so that operations are simplified, thereby effectively improving use efficiency and use convenience of the power tool.

In an embodiment, referring to FIG. 4, the power tool further includes an output head switching unit 500. The output head switching unit 500 is respectively connected to the output heads 100, and switches the output head 100 at the working position in response to external triggering, to change the detection signal of the output head detection assembly, where the controller can switch the working mode of the output head at the working position in response to a change in the detection signal.

The output head switching unit 500 is connected to a body of the power tool, and can rotate relative to the body of the power tool. The output head 100 is relatively fixedly connected to the output head switching unit 500. After the output head switching unit 500 is unlocked from the main housing through the operation button 21, the output head may be operated to rotate relative to the body. Alternatively, for example, a specific mechanism may be operated to control the motor to drive the output head to implement the automatic rotation of the output head relative to the body. When the output head switching unit 500 rotates relative to the body, the output head 100 also rotates accordingly, so that the output head 100 at the working position may be switched. When the output head 100 at the working position is switched, the detection signal of the output head detection assembly is changed correspondingly. The controller controls, according to a change in the detection signal, the working mode to correspondingly change. For example, the current output head 100 at the working position is the output head a, and a working mode corresponding to the output head is the working mode 1. When the output head switching unit 500 switches the output head 100 at the working position to the output head b, the detection signal of the output head detection assembly 200 is changed. In this case, the controller controls the working mode of the output head at the working position to switch from the working mode 1 to the working mode 2.

During actual application, the output head switching unit 500 and the function switching unit 300 may be used in combination. For example, in an initial state, the output head a is located at the working position, and a working mode of the output head is the working mode 1, that is, the output head a—the working mode 1. (1). The output head b may be switched to the working position by rotating the output head switching unit 500, the detection signal is changed, and the working mode is switched to the working mode 2, in other words, the output head b—the working mode 2. (2). On the basis of the initial state, the function switching unit 300 may be triggered, and a working mode of the output head a is switched to the working mode 2, in other words, the output head a—the working mode 2. (3). On the basis of (2), the output head switching unit 500 is rotated to switch the output head b to the working position, and in this case, the detection signal is changed, the working mode is switched to the working mode 1, in other words, the output head b—the working mode 1. (4). On the basis of (3), the function switching unit 300 is triggered, and a working mode of the output head b is switched to the working mode 2, in other words, the output head b—the working mode 2. (5). On the basis of (4), the function switching unit 300 is triggered, and the working mode of the output head b is switched to the working mode 1, in other words, the output head b—the working mode 1.

A working mode corresponding to each output head is not unique. The output head may be associated with a plurality of working modes. Through the function switching unit or the output head switching unit, the output head at the working position and the working mode of the output head at the working position may be quickly and freely switched as required.

In an embodiment, the output head detection assembly includes a detection element, and the detection element may include a Hall sensor, a light sensor or a proximity sensor. With the foregoing sensor, a change in a position of an output head can be quickly and accurately detected, and a corresponding detection signal can be generated.

Figure 6:
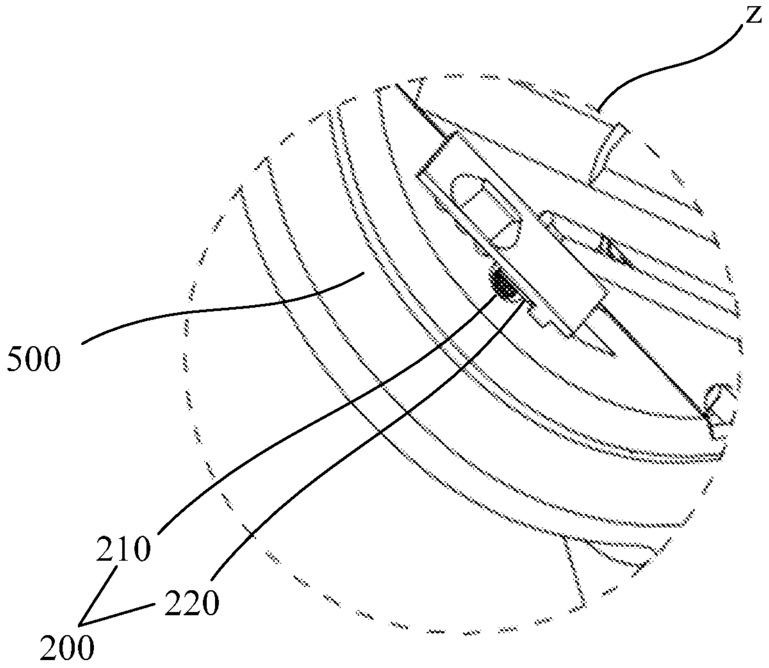
FIG. 6 is an enlarged view of a region z in FIG. 5.

Specifically, referring to FIG. 6, the output head detection assembly 200 includes a first detection element 210 and a second detection element 220 that match each other. When the output heads 100 are separately switched to the working position, a position of the first detection element 210 relative to the second detection element 220 is changed to different degrees, and the second detection element 220 generates different detection signals according to the changes of the position to different degrees of the first detection element 210.

Specifically, position relationships between the first detection element 210 and the output heads 100 may be relatively fixed. In other words, when the position of the output head 100 changes, a position of the first detection element 210 is accordingly changed, and a position of the second detection element 220 remains unchanged. In other words, the position of the first detection element 210 relative to the second detection element 220 is changed. When the first detection element 210 is at different positions, the second detection element 220 may sense different signals. In this way, the position of the output head 100 may be detected through a combination of the first detection element 210 and the second detection element 220.

The first detection element 210 may be disposed on the output head switching unit 500, and the second detection element 220 may be disposed at a position that is on the body and is close to the output head switching unit 500.

As an alternative, position relationships between the second detection element 220 and the output heads 100 may be relatively fixed. In other words, when the position of the output head 100 changes, a position of the second detection element 220 is accordingly changed, and a position of the first detection element 210 remains unchanged. In other words, the position of the first detection element 210 relative to the second detection element 220 is changed. When the second detection element 220 is at different positions, the second detection element 220 may sense different signals, to further detect the position of the output head 100.

The second detection element 220 may be disposed on the output head switching unit 500, and the first detection element 210 may be disposed at a position that is on the body and is close to the output head switching unit 500.

In an embodiment, the first detection element 210 includes a magnet, and the second detection element 220 includes a Hall sensor or a proximity sensor. When the magnet and the Hall sensor/proximity sensor are at different distances, signals detected by the Hall sensor or proximity sensor are different. Through combined use of the Hall sensor/proximity sensor and the magnet, a position detection process is simplified, the structure is simple, and implementation is easy.

A detection signal of the Hall sensor/proximity sensor includes a low level and a high level. For example, when the detection signal is at the low level, the output head a is located at the working position. When the detection signal is at the high level, the output head b is located at the working position. There are two association manners: The high level corresponds to the working mode 1, and the low level corresponds to the working mode 2, or the low level corresponds to the working mode 1, and the high level corresponds to the working mode 2.

In another embodiment, the first detection element 210 includes a light source that can continuously emit a light beam. The light source includes a semiconductor light source, a light-emitting diode, a laser diode, an infrared emission diode, or the like. The second detection element 220 includes a light sensor that can receive and detect light. When the light source and the light sensor are at different positions, the light sensor can detect different signals according to whether light is received or intensity of received light, so that position detection is simply implemented.

It needs to be noted that there are various types of output head detection assemblies 200, provided that during alternate switching of the output heads 100, a working mode of the power tool 10 can be synchronously changed through the output head detection assembly 200.

In an embodiment, the function switching unit can further generate, in response to external triggering, a torque switching signal used for indicating to switch a working torque of the output head at the working position, where the controller can switch the working torque of the output head at the working position in response to the torque switching signal. In some working modes, there is a requirement of setting a torque of the output head at the working position. In this embodiment, the working torque of the output head at the working position may be switched through the function switching unit. Specifically, a user may trigger the function switching unit according to a preset rule, so that a torque switching signal corresponding to a specific torque value may be generated. When the controller detects a corresponding torque switching signal, the working torque of the output head at the working position may be adjusted to a corresponding torque value.

In an embodiment, the function switching unit includes a first switching region 310 and a second switching region 320, the working mode of the output head includes a first mode and a second mode, and the first switching region 310 and the second switching region 320 respectively correspond to the first mode and the second mode. In this embodiment, the output head at the working position may be adjusted to the first mode by triggering first switching region 310, and the output head at the working position may be adjusted to the second mode by triggering the second switching region 320. The switching regions respectively correspond to the working modes, which facilitates operation, and an error does not occur easily.

In this embodiment, the function switching unit 300 includes trigger buttons corresponding to the working modes. For example, the first switching region 310 includes a first button 311, and the first button 311 can generate the mode switching signal in response to external triggering, to switch the working mode of the output head at the working position to the first mode; and the second switching region 320 includes a second button 321, and the second button 321 can generate the mode switching signal in response to external triggering, to switch the working mode of the output head at the working position to the second mode.

For example, the working mode 1 has a corresponding trigger button, and the working mode 2 has a corresponding trigger button. If a working mode of the current output head 100 at the working position to the working mode 1 or 2, it is only necessary to trigger the trigger button corresponding to the working mode 1 or 2. Certainly, only one trigger button may be disposed. Switching of different working modes is implemented by performing different triggering operations on the trigger button. For example, different quantities of pressing times correspond to different working modes. Alternatively, a knob form is used for the trigger button, and different rotational angles correspond to different working modes. There may be various manners in which the trigger button is disposed. Only the several manners above are listed in this embodiment. Other similar implementations are also applicable, and are listed one by one herein.

In this embodiment, the first button 311 can further generate a torque switching signal in response to external triggering, to change a working torque of the output head at the working position. A torque switching signal may be generated by triggering the first button 311, to facilitate setting of the torque. An output torque may be adjusted in a manner of tapping or long pressing the first button 311.

Figure 5:
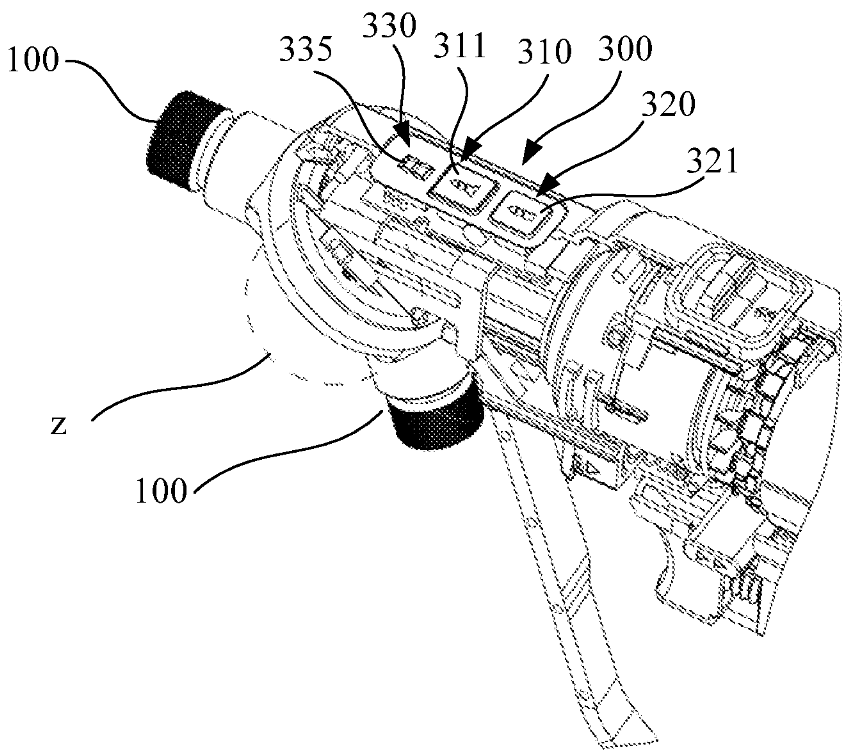
FIG. 5 is a schematic diagram of a partial structure of a power tool according to an embodiment of this application.

In addition, to facilitate setting and viewing of the torque, the first switching region 310 of the function switching unit 300 further includes a display region 330. The display region is used for displaying a current torque value or torque shift position. Referring to FIG. 4 and FIG. 5, a nixie tube 335 may be disposed in the display region 330, and the nixie tube 335 displays a current torque.

In this embodiment, as shown in FIG. 4 and FIG. 5, the first switching region 310 and the second switching region 320 are sequentially disposed in a longitudinal axis direction of the main housing. Specifically, the first button 311, the second button 321, and the display region 330 are linearly arranged at a top of the main housing 12. At a front portion position of the body close to the output head 100, a radial dimension of the body is reduced, so that the power tool has better accessibility and can better enter a narrow space. The first button 311, the second button 321, and the display region 330 in this embodiment are linearly arranged in parallel along a longitudinal axis of the main housing. Such an arrangement is suitable for a body arrangement with good accessibility.

In an embodiment, to make it convenient for a user to determine the working mode of the output head 100 at the working position and adjust the power tool accurately and quickly to a working mode that needs to be used, the function switching unit further includes an indicator lamp corresponding to the working modes. The indicator lamp is used for indicating the working mode of the current output head 100 at the working position.

Specifically, there may be various types of implementations of the indicator lamp. A plurality of indicator lamps may be disposed in a preset region other than the switching region on the body. The indicator lamps respectively correspond to the working modes. When a working mode is entered, an indicator lamp corresponding to the working mode is controlled to be lit. Alternatively, only one indicator lamp may be disposed, and may display different colors. The colors respectively correspond to the working modes. When a working mode is entered, the indicator lamp is controlled to display a corresponding color. Marks or patterns representing the working modes are disposed on the trigger button. The trigger button may be disposed as a membrane button, which has good operation sensitivity and feel. A surface of the trigger button may be disposed to be transparent, and an indicator lamp is disposed below the trigger button. When there are a plurality of trigger buttons, the trigger buttons respectively correspond to the working modes. When a trigger button is triggered, an indicator lamp below the trigger button is controlled to be lit. When the indicator lamp below the trigger button is lit, a corresponding mark or pattern representing a working mode is lit. When there is one trigger button, different triggering operations are performed on the trigger button to implement switching of different working modes, only one indicator lamp may be disposed below the trigger button, and may display different colors. The colors respectively correspond to the working modes. When a working mode is entered, the indicator lamp is controlled to display a corresponding color.

An indicator lamp is correspondingly disposed for a working mode. A digital interface is disposed to clearly display a torque, for easy observation by a user in a place with dim light, to facilitate settings by the user.

The indicator lamp may be an LED lamp.

In an embodiment, the first mode is a screwdriver mode, and the second mode is a drill mode. The display region is used for displaying an output torque of the power tool when the current working mode is the screwdriver mode. When the current working mode is the screwdriver mode, the output torque is adjustable. Therefore, when the screwdriver mode is entered, a current output torque of the power tool may be displayed in the display region, for a user to learn about a current torque.

In this embodiment, when the working mode of the output head at the working position is the screwdriver mode, in response to triggering of a button corresponding to the drill mode, the output head at the working position may enter the drill mode. When the working mode of the output head at the working position is the drill mode, in response to triggering of the button corresponding to the drill mode or a button corresponding to the screwdriver mode, the output head at the working position may enter the screwdriver mode. In other words, when the working mode of the output head at the working position is the drill mode, the drill mode may be canceled by triggering the button corresponding to the drill mode.

In an embodiment, the controller 400 further obtains a current detection signal and a working mode of the current output head 100 at the working position in response to stopping of the power tool, and stores a working association state, in other words, an association relationship between a detection signal and a working mode.

When the controller determines that the power tool stops, the controller actively collects and stores current state information, specifically, obtains the current detection signal and the working mode of the output head 100 at the working position, and associates and stores the current detection signal and the working mode. In this way, before formal power-off, the last association state of the output head 100 may be stored before power-off, so that the stored association state may be directly invoked after the power tool is started a next time, to quickly learn about a status of the output head 100, and the output head 100 or the working mode is accurately adjusted, to adapt to a current operating requirement.

In this embodiment, in a working mode, a set torque is provided, and while storing the working association state, the controller may further store a value of the current torque, so that after power tool is powered up a next time, torque information of the output head may be quickly determined.

It needs to be noted that, when storing the working association state, the controller may store a group of association relationships, or may store a plurality of groups of association relationships. For example, the detection signal may include a first signal and a second signal. The working mode includes the first mode and the second mode. The current detection signal is the first signal, and the working mode of the output head at the working position is the first mode. In other words, the first signal corresponds to the first mode, and the second signal corresponds to the second mode. The controller may store only a group of association relationships between the first signal and the first mode or a group of association relationships between the second signal and the second mode, or may store both groups of association relationships. Similarly, when there are more types of detection signals and more types of working modes, there are more groups of association relationships. The controller may store only some association relationships, provided that the controller may deduce, according to the stored some association relationships, the remaining association relationships to achieve the objective of this application. In this way, an internal storage space of the controller may be released, and resources are saved.

The controller may determine, when detecting that a working state parameter of the power tool satisfies a preset condition, that the power tool stops, and the working state parameter may include at least one of a voltage, a current, a temperature, a motor rotation speed, and motor stop duration.

During actual application, when the power tool stops, a fixed stop signal is not necessarily generated. Therefore, the controller may determine whether the power tool stops. When the power tool is in a stopped state, some working state parameters change significantly relative to a running state, for example, a current and a voltage drop, a temperature decreases, a motor stops running, or the like. Based on this, the controller may acquire and analyze the foregoing working state parameters to deduced whether the power tool stops.

In an embodiment, the controller is further used for reading a prestored working association state after the power tool is powered up. After the controller detects that the power tool is powered up, the controller can obtain a working association state stored when the power tool is powered off last time, to accurately determine a state of the output head at the working position.

Embodiments of this application further provide a control method of a power tool. A power tool includes at least two output heads 100. The control method of a power tool is applicable to the power tool provided in the foregoing embodiment, and is also applicable to another power tool with a similar structure.

Figure 7:
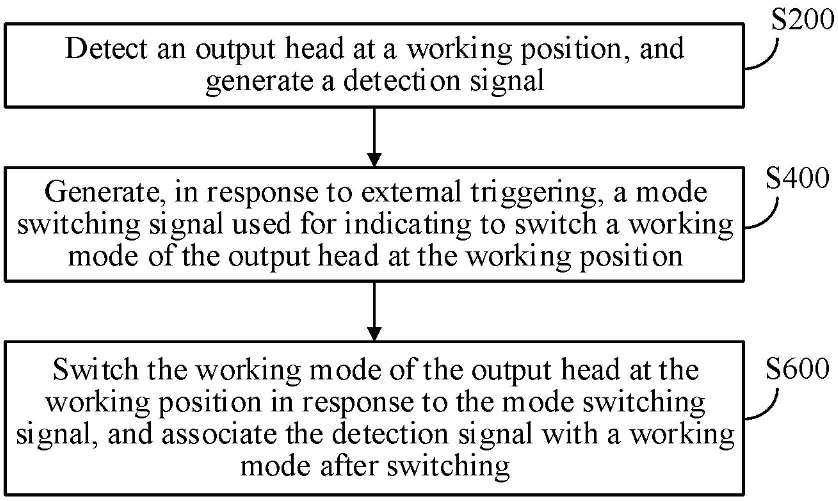
FIG. 7 is a procedure block diagram of a control method of a power tool according to an embodiment of this application.

Referring to FIG. 7, in an embodiment, the control method of a power tool includes the following steps:

Step S200: Detect an output head 100 at a working position, and generate a detection signal, where the detection signal is associated with a working mode of the output head 100, and when different output heads are located at the working position, corresponding detection signals are different.

Step S400: Generate, in response to external triggering, a mode switching signal used for indicating to switch a working mode of the output head 100 at the working position.

Step S600: Switch the working mode of the output head 100 at the working position in response to the mode switching signal, and associate the detection signal with a working mode after switching.

The control method of a power tool provided in this embodiment and the power tool provided in the foregoing embodiment belong to the same inventive concept. For the description of the power tool and the foregoing steps, refer to specific content in the foregoing embodiment. Details are not described herein again.

In the foregoing control method of a power tool, the output head 100 at the working position is detected and a corresponding detection signal is generated. A mode switching signal is generated in response to external triggering. The mode switching signal is used for indicating to switch the working mode of the output head 100 at the working position. The working mode of the output head 100 at the working position is switched in response to the mode switching signal, and a current detection signal is associated with a working mode after switching. In other words, one same output head 100 may have a plurality of working modes. When one same output head 100 is at the working position, the working mode of the output head may be switched, and the working mode after switching is associated with a current detection signal. Because detection signals correspond one to one to positions of output heads 100, it is implemented that the working mode after switching is associated with and matches a current output head 100 at the working position. In this way, switching of working modes can be implemented without switching output heads 100, and it is ensured that an output head 100 at a working position accurately corresponds to a required working mode, so that operations are simplified, thereby effectively improving use efficiency and use convenience of the power tool.

In an embodiment, the control method of a power tool further includes:

- when a power-up is detected, reading a prestored working association state, where the working association state is used for representing an association relationship between the detection signal and a working mode;
- determining the working mode of the output head 100 at the working position according to the detection signal and the working association state; and
- switching the working mode of the output head 100 at the working position in response to the mode switching signal, associating the detection signal with the working mode after switching, and updating the working association state.

In a conventional solution, after the power tool is powered off, if the output head 100 is switched. Because a control board of the power tool is not energized, even if the output head 100 is switched, the working mode cannot correspondingly change along with switching of the position of the output head 100. When the power tool is powered up again, the current output head 100 at the working position may be inconsistent with that before the power tool is powered off, which tends to misguide an operator to perform a misoperation. To clarify the current output head 100 at the working position and the working mode of the output head after the power tool is powered up, in this embodiment, after it is detected that the power tool is powered up, the prestored working association state about the detection signal and the output head 100 at the working position is invoked, and then the current detection signal is obtained. In this way, the current output head 100 at the working position and the working mode of the current output head may be determined. If the mode switching signal is detected in a subsequent use process, the working association state is updated.

In an embodiment, the control method of a power tool further includes: controlling an indicator lamp to be turned on, to indicate the working mode of the output head 100 at the working position.

To clarify the current output head 100 at the working position and the working mode of the output head after the power tool is powered up, in this embodiment, after it is detected that the power tool is powered up, the prestored working association state about the detection signal and the output head 100 at the working position is invoked, and then the current detection signal is obtained. In this way, the current output head 100 at the working position and the working mode of the current output head may be determined. If the mode switching signal is detected in a subsequent use process, the working association state is updated.

In an embodiment, the detection signal includes a Hall signal, a light signal, or a proximity signal. The detection signal includes a first signal and a second signal. The working mode includes a first mode and a second mode. The working association state between the detection signal and the working mode includes: the first signal corresponds to the first mode, and the second signal corresponds to the second mode; or the first signal corresponds to the second mode, and the second signal corresponds to the first mode.

It is assumed that the working association state obtained after the power tool is powered up is that the first signal corresponds to the first mode and the second signal corresponds to the second mode, where the first signal corresponds to that the output head a is in the working position, and the second signal corresponds to that the output head b is in the working position. The current detection signal is the first signal. In this case, it may be determined that the output head a is currently at the working position and is in the first mode.

In an embodiment, when the mode switching signal is detected, the step of switching the working mode of the output head 100 at the working position, associating the working mode after switching with a current detection signal, and updating the working association state includes the following steps:

- when the mode switching signal corresponding to the first mode is detected, controlling the working mode of the current output head 100 at the working position to enter the first mode, and associating the first mode with the current detection signal; and
- when the mode switching signal corresponding to the second mode is detected, controlling the working mode of the current output head 100 at the working position to enter the second mode, and associating the second mode with the current detection signal.

It needs to be noted that, when it is determined that the working mode of the current output head 100 at the working position is the second mode, upon detection of the mode switching signal corresponding to the first mode or the second mode, the working mode of the current output head 100 at the working position may be switched from the second mode to the first mode.

The first mode may be a screwdriver mode, and the second mode may be a drill mode.

In an embodiment, after the step of determining the working mode of the current output head 100 at the working position according to the detection signal and the working association state, the control method of a power tool further includes:

- when it is determined that the working mode of the current output head 100 at the working position is the first mode, upon detection of a switching signal of the output head 100, switching the working mode of the output head 100 at the working position after switching to the second mode; and
- when it is determined that the working mode of the current output head 100 at the working position is the second mode, upon detection of a switching signal of the output head 100, switching the working mode of the output head 100 at the working position after switching to the first mode.

In other words, in addition to switching the working mode of the current output head 100 at the working position by using the function switching unit 300, the output head 100 at the working position and the working mode of the output head may be switched in a manner of switching the output head 100 by using an output head switching member 500. The two manners may be used in combination.

In an embodiment, after the step of determining the working mode of the current output head at the working position according to the detection signal and the working association state, the control method of a power tool further includes:

when it is determined that the working mode of the current output head at the working position is the first mode, in response to detecting a torque switching signal corresponding to the first mode, controlling to switch a working torque of the output head 100 at the working position.

In an embodiment, after the step of determining the working mode of the current output head 100 at the working position according to the detection signal and the working association state, the control method of a power tool further includes: controlling an indicator lamp to be turned on, to indicate the working mode of the current output head 100 at the working position.

In an embodiment, the control method of a power tool further includes: when it is determined that the working mode of the current output head 100 at the working position is the first mode, controlling a display region 330 to be turned on, to indicate a working torque of the current output head at the working position.

In an embodiment, the control method of a power tool further includes:

when it is determined that the power tool stops, determining a current detection signal and the working mode of the current output head 100 at the working position; and storing a working association state. In an embodiment, the control method of a power tool further includes: when it is determined that the power tool stops, storing a working torque in the first mode.

In an embodiment, the control method of a power tool further includes:

detecting a working state parameter of the power tool; and when the working state parameter satisfies a preset condition, determining that the power tool stops, where the working state parameter includes at least one of a voltage, a current, a temperature, a motor rotation speed, and motor stop duration.

For example, when it is detected that the voltage or the current or the temperature or the motor rotation speed is less than a corresponding value, it is determined that the power tool stops, or, when it is detected that the motor stop duration reaches corresponding duration, it is determined that the power tool stops.

Figure 8:
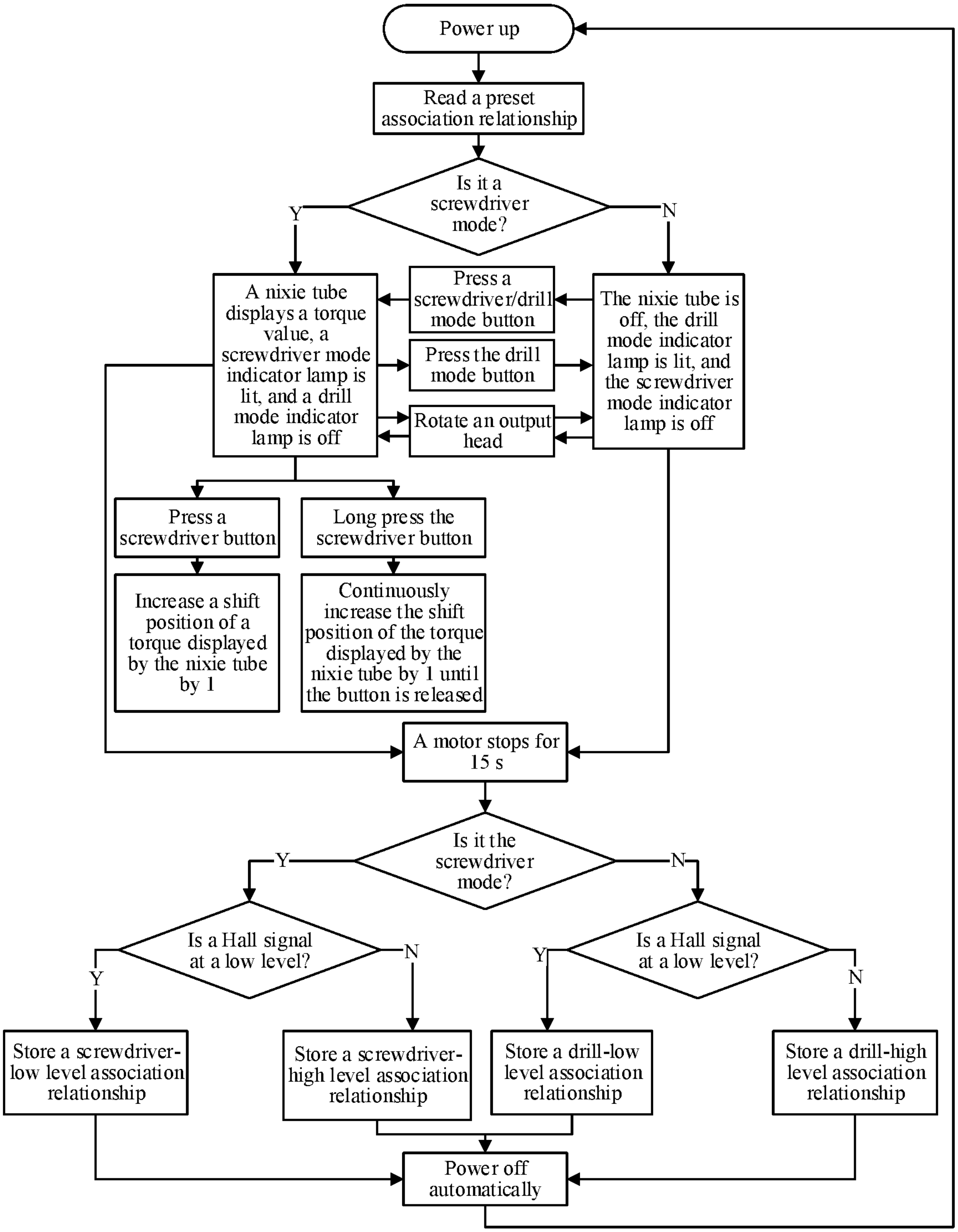
FIG. 8 is a procedure block diagram of a specific example of a control method of a power tool according to an embodiment of this application.

The control method provided in this embodiment is described below by using a specific example with reference to FIG. 8:

Step 1: After the power tool is powered up, read a prestored association relationship between a detection signal and a working mode, and determine, in combination with a current detection signal, whether an output head at a working position is a screwdriver mode. In a screwdriver mode, Step 2 is performed. In a drill mode, Step 3 is performed.

Step 2: Light an indicator lamp corresponding to the screwdriver mode, turn off an indicator lamp corresponding to the drill mode, and simultaneously, control a nixie tube to display a prestored torque in the screwdriver mode.

In the screwdriver mode, when a button corresponding to the screwdriver mode is tapped, a torque shift position displayed by the nixie tube is increased by 1, or when the button corresponding to the screwdriver mode is long pressed, the torque shift position displayed by the nixie tube is continuously increased by 1 until the button is released. A display value range of the nixie tube may be changed among 1 to 9. Alternatively, the nixie tube displays a specific torque value, and the torque value is adjusted by long pressing or tapping a corresponding button.

In the screwdriver mode, the output head at the working position may enter the drill mode by tapping the button corresponding to the drill mode or rotating the output head.

Step 3: Light the indicator lamp corresponding to the drill mode, and turn off the indicator lamp corresponding to the screwdriver mode and the nixie tube.

In the drill mode, the output head at the working position may enter the screwdriver mode by tapping the button corresponding to the screwdriver mode or rotating the output head.

Step 4: After it is detected that a motor has stopped for 15 s, obtain the working mode of the output head at the working position, and determine whether the working mode is the screwdriver mode; if the working mode is the screwdriver mode, obtain a current Hall signal, and determine whether the Hall signal is at a low level; if the Hall signal is at a low level, store a screwdriver mode-low level association relationship; if the Hall signal is at a high level, store a screwdriver mode-high level association relationship; if the working mode is the drill mode, obtain a current Hall signal, determine whether the Hall signal is at a low level; if the Hall signal is at a low level, store a drill mode-low level association relationship; and if the Hall signal is at a high level, store a drill mode-high level association relationship.

Step 5: Automatically power off the power tool after the association relationship between the working mode and the detection signal is stored.

Figure 9:
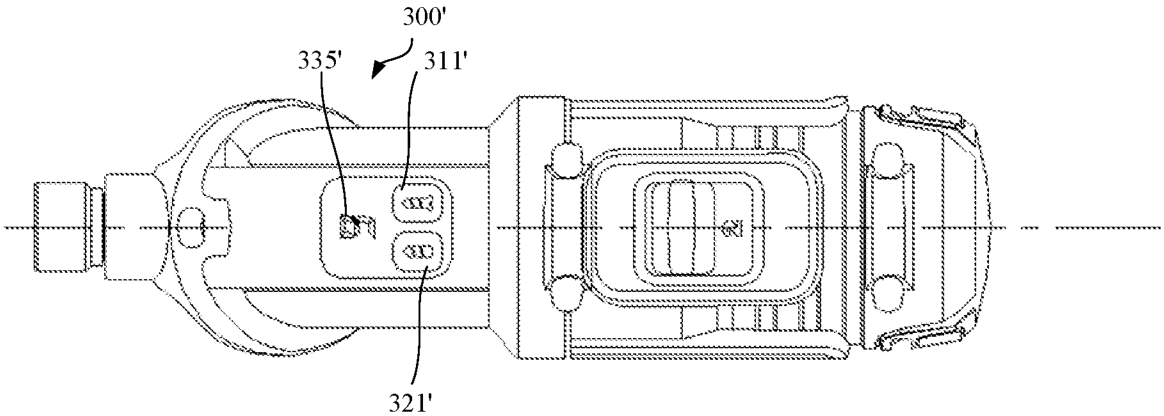
FIG. 9 is a schematic top view of a control interface of a power tool according to another embodiment of this application.

FIG. 9 is a schematic diagram of a control interface of a power tool according to another embodiment. Referring to FIG. 9, in this embodiment, a function switching unit 300' includes a first button 311' and a second button 321' that are disposed in parallel in a transverse direction perpendicular to a longitudinal axis direction of a main housing. A screwdriver bit pattern is disposed on the first button 311', and a drill bit pattern is disposed on the second button 321'. A first working indicator lamp corresponding to the first button 311' and a second working indicator lamp corresponding to the second button 321' are respectively disposed below the first button 311' and the second button 321'. The first working indicator lamp and the second working indicator lamp are both LED backlight lamps.

Figure 10:
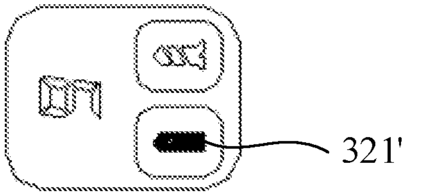
FIG. 10 is a schematic diagram of the power tool in FIG. 9 being switched to a drill mode.
Figure 11:
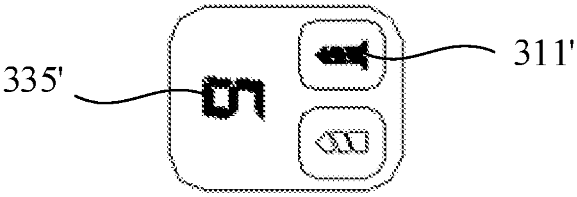
FIG. 11 is a schematic diagram of the power tool in FIG. 9 being switched to a screwdriver mode.

Specifically, referring to FIG. 10 and FIG. 11, when the first button 311' is pressed, the power tool generates a mode switching signal in response to external triggering, to switch a working mode of an output head at a working position to a screwdriver mode. The screwdriver bit pattern is correspondingly lit, that is, the first working indicator lamp is lit, and the controller associates a detection signal of the output head at the working position with the screwdriver mode. When the second button 321' is pressed, the power tool generates a mode switching signal in response to external triggering, to switch the working mode of the output head at the working position to a drill mode. The drill bit pattern is correspondingly lit, that is, the second working indicator lamp is lit, and the controller associates the detection signal of the output head at the working position with the drill mode. Particularly, when the second button 321' is pressed again, the power tool switches the working mode of the output head at the working position to the screwdriver mode, that is, cancels the drill mode, and enters the screwdriver mode. The screwdriver bit pattern is lit, and simultaneously an LED lamp of the drill bit pattern is turned off, and a working association state is correspondingly updated.

In an embodiment, in the screwdriver mode, the first button 311' further integrates a function of torque adjustment and has a function of setting a torque of an output shaft. A torque shift position may be adjusted by tapping the first button 311', and a torque may be continuously adjusted by long pressing the first button. The torque shift position or the torque value is directly displayed on a nixie tube 335' in a digital form in a lit manner. The nixie tube 335' may be covered by a transparent label film.

A control logic used for the power tool in this embodiment is consistent with that in the foregoing embodiment. Details are not described herein again.

Figure 12:
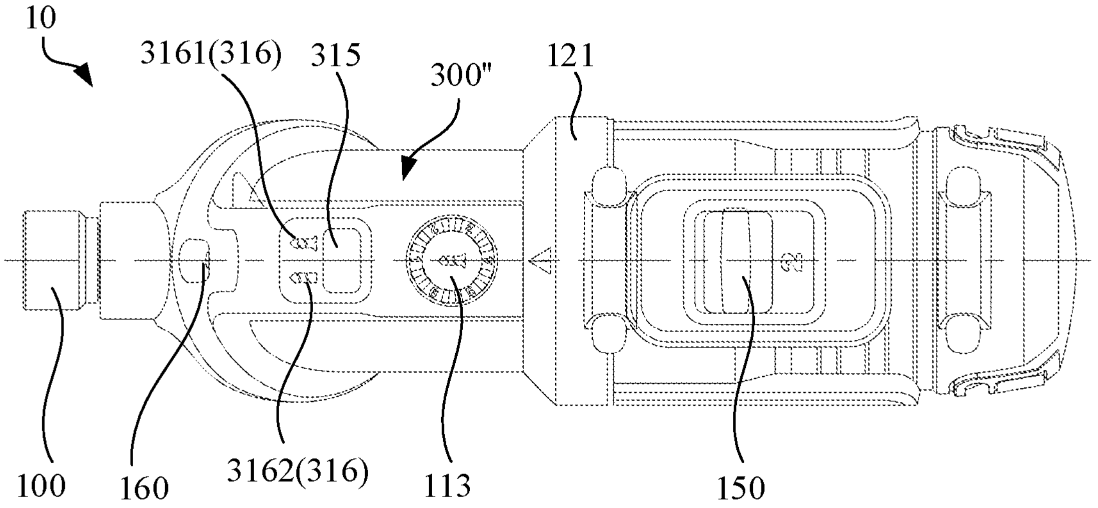
FIG. 12 is a schematic top view of a control interface of a power tool according to another embodiment of this application.

FIG. 12 is a schematic diagram of a control interface of a power tool according to another embodiment. As shown in FIG. 12, in this embodiment, a function switching unit 300" at least includes a first button 315, which can generate a mode switching signal in response to external triggering, where the mode switching signal is used for switching a working mode of the power tool.

The function switching unit 300" further includes an indication member 316. The indication member 316 is electrically connected to the controller 400. The indication member 316 is used for indicating a current working mode that the power tool 10 is in. In this way, through the indication member 316, a working mode to which the output head 100 at the working position currently corresponds is clarified, to make it convenient for an operator to accurately and quickly adjust the power tool 10 to a required working mode, enabling the operator to quickly complete a hole drilling or screw turning operation.

It needs to be noted that the indication member 316 may be an indicator lamp or may be a display screen or may be another indication article, for example, an electrochromic polymer, or the like. When the indication member 316 is an indicator lamp (for example, an LED lamp), the current working mode is indicated by the lamp being lit or off. For example, when the lamp is lit, the current working mode is a drill mode, and when the lamp is off, the current working mode is a screwdriver mode. Certainly, there may be one, two, three or more indication members 316. When there are a plurality of indication members 316, the plurality of indication members 316 may all be indicator lamps or display screens. Alternatively, some indication members 316 are indicator lamps, and some other indication members 316 are display screens.

Further, the indication member 316 includes a first indication member 3161 and a second indication member 3162. When the power tool 10 is in the drill mode, the first indication member 3161 is in a working state. When the power tool 10 is in the screwdriver mode, the second indication member 3162 is in a working state. It can be learned that one indication member 316 is used for indicating whether the mated output head 100 is in the drill mode, and the other indication member 316 is used for indicating whether the mated output head 100 is in the screwdriver mode.

In this embodiment, the power tool 10 further includes a torque adjustment member 113 electrically connected to the controller. The controller 400 is electrically connected to the function switching unit 300".

Different from the foregoing embodiments, in this embodiment, only one first button 315 is disposed, and is used for switching working modes. Specifically, the first button 315 is pressed to enter another a working mode, and a working association state between a detection signal of an output head at a working position and a working mode is updated. In addition, the torque adjustment member 113 is used for separately adjusting an output torque of the output head 100 at the working position. For the setting and working logic of the indicator lamp and the nixie tube, refer to the foregoing embodiments. Details are not described herein again.

Specifically, the function switching unit 300 generates a mode switching signal in response to external triggering, and the controller 400 sets the power tool to the drill mode or the screwdriver mode according to the mode switching signal. Specifically, when the power tool is in the drill mode, a drill mode indicator lamp is lit, and the first button 315 is triggered to generate a mode switching signal. A working mode of the output head 100 mated to the output shaft 130, in other words, the output head 100 at the working position, is switched to the screwdriver mode, simultaneously the drill mode indicator lamp is turned off, a screwdriver mode indicator lamp is lit, and a current detection signal of an output head detection assembly is correspondingly associated with the screwdriver mode. Correspondingly, when power tool is in the screwdriver mode, the first button 315 is triggered again to generate a mode switching signal. The working mode of the output head 100 at the working position is switched to the drill mode, simultaneously the screwdriver mode indicator lamp is turned off, the drill mode indicator lamp is lit, and the current detection signal of the output head detection assembly is correspondingly associated with the drill mode.

In one of the embodiments, when the power tool is in the drill mode, and the output head 100 mated to the output shaft 130 outputs a constant torque. When the power tool 10 is in the screwdriver mode, the torque adjustment member 113 operably adjusts an output torque of the output shaft 130 in a preset range. The torque adjustment member 113 in this embodiment is disposed as a torque control turntable with rotational adjustment. Values or shift position values of corresponding torques are disposed on the turntable. In the screwdriver mode, an operator conveniently makes an adjustment to obtain a required torque value or torque shift position as required.

A mechanical arrangement of the power tool in this embodiment is consistent with that in the foregoing embodiment. Details are not described herein again.

Embodiments of this application further provide a power tool. Referring to FIG. 1 to FIG. 3, the power tool includes a housing 12, a motor 15, an output shaft 130, a working assembly 120, and a control apparatus. The control apparatus includes a function switching unit 300 and a controller 400 electrically connected to the function switching unit 300. The function switching unit 300 is used for inputting a mode switching signal. The controller 400 sets the power tool 10 to a drill mode or a screwdriver mode according to the received mode switching signal. When the power tool 10 is in the drill mode, an output head 100 at a working position outputs a constant torque. When the power tool 10 is in the screwdriver mode, the output torque of the output head 100 at the working position is adjustable in a preset range.

Corresponding to any output head 100 at the working position, the function switching unit 300 operably enables the power tool 10 to switch the drill mode and the screwdriver mode.

For the foregoing power tool 10, in a use process, the output head 100 is switched, so that the output head 100 is alternately mated to the output shaft 130 to be at the working position, to ensure that the motor 15 can drive the output head 100 to rotate through the output shaft 130, to perform a hole drilling or screw turning operation. The function switching unit 300 is integrated in this power tool 10. Therefore, when an operator needs to perform operations in different working modes, the operator may use the function switching unit 300 to operably input (for example, press, swipe, spin, or the like) a corresponding mode switching signal in the power tool 10. The controller 400 controls the power tool 10 according to the received mode switching signal to set a required working mode (for example, the drill mode or the screwdriver mode), to implement that any output head 100 is not limited to one working mode. In this way, in an operation process, the operator does not need to frequently switch the position of the output head 100, to effectively simplify operations of the power tool 10, thereby improving working efficiency. In addition, when holes with different sizes need to be drilled or screws with different models need to be turned, drill bits or screwdrivers with different models may be mounted on at least two output heads 100 in advance. In this way, during use, it is only necessary to switch the position of the output head 100, and a mode switching signal is correspondingly inputted by using the function switching unit 300 to ensure that the power tool 10 remains in a required working mode, so that an operation of drilling holes with different sizes or turning screws with different models may be completed without frequently changing working accessories, thereby further improving operation experience of the product.

In an embodiment, when the power tool 10 is in different working modes, the output torque of the output head 100 at the working position may be in a constant state, or may be adjustable in a preset range. In the two implementations of a torque output, input power control of the motor 15 may be used for implementation. For example, when receiving a mode switching signal, the controller 400 changes a control circuit in the power tool 10, to affect an input power in the motor 15, thereby changing an output torque of the motor 15. For example, the controller 400 is a microcontroller. A driver module is integrated on the microcontroller. When the microcontroller receives a mode switching signal, the driver module sends a MOS drive signal to a power module, for example, implements an output of different powers in a manner of adjusting a duty cycle or the like. A circuit between the microcontroller and the motor 15 is not an object to be improved in this embodiment. Therefore, a specific circuit is not described again herein. In addition, it should be understood that the function switching unit 300 in this embodiment at least includes an operation part and a detection part, a control part, and the like that are associated with the operation part. A specific structure of the function switching unit may have a plurality of designs, provided that the power tool 10 is triggered to switch between the drill mode and the screwdriver mode.

It needs to be further noted that the working mode of the power tool 10 at least includes the drill mode and the screwdriver mode. The drill mode and the screwdriver mode are preset in the power tool 10. When the power tool 10 is switched to the drill mode, the output torque of the output head 100 at the working position outputs a constant torque. When the power tool 10 is switched to the screwdriver mode, the output torque of the output head 100 at the working position may be adjustable in a preset range. The preset range may be determined according to an actual product.

The power tool 10 further includes a torque adjustment member electrically connected to the controller 400. When the power tool 10 is switched to the screwdriver mode, the torque adjustment member is activated. It needs to be noted that a manner of switching the power tool 10 to the screwdriver mode may be not limited to automatic switching and manual switching, and the torque adjustment member may be triggered provided that the power tool 10 is in the screwdriver mode. When torque adjustment member is activated, an operator may use the torque adjustment member to set the output torque of the output head 100 in a preset range, to satisfy screw turning operations with different turning forces.

It needs to be noted that, an adjustment manner of the torque adjustment member may be a rotation manner or may be a pressing manner, or the like. As shown in FIG. 12, the torque adjustment member 113 is an independently disposed knob. When the torque adjustment member 113 uses a rotational adjustment manner, the torque adjustment member 113 may be a dial potentiometer device, or the like. As shown in FIG. 9, when the screwdriver mode is entered, the first button 311' is activated as the torque adjustment member, and can adjust the working torque of the output head in response to external triggering/pressing.

It needs to be further noted that, in an adjustment process of the torque adjustment member, one or more shift positions may be set. For example, after the torque adjustment member is activated, for every time of triggering, the output torque of the output head 100 at the working position may be adjusted once. For example, there are nine shift positions. After the torque adjustment member is activated, for every time of triggering, a shift position value of the output torque may be sequentially incremented from the first gear to the ninth gear (certainly, may be decremented in other embodiments). When the shift position value is the ninth gear, triggering takes place again, and the shift position value may be cyclically reset to the first gear.

In an embodiment, referring to FIG. 1 and FIG. 2, the power tool 10 includes a gear transmission mechanism 155 that is disposed between the motor 15 and the output shaft 130 and a shift position adjustment member 150 that is movable between a first position and a second position relative to the housing 12. When the power tool 10 is in the drill mode and the shift position adjustment member 150 is at the first position, the gear transmission mechanism 155 has a first transmission ratio, and the output head 100 at the working position can output a first constant rotation speed. When the power tool 10 is in the drill mode and the shift position adjustment member 150 is at the second position, the gear transmission mechanism 155 has a second transmission ratio, the output head 100 at the working position can output a second constant rotation speed. As can be learned, when the power tool 10 is in the drill mode, an output of the output head 100 at the working position can be adjusted between at least two rotation speeds. When the shift position adjustment member 150 moves to the first position, a transmission ratio of the gear transmission mechanism 155 is changed to the first transmission ratio, so that the output head 100 at the working position performs an output at the first constant rotation speed. Similarly, when the shift position adjustment member 150 moves to the second position, the transmission ratio of the gear transmission mechanism 155 is adjusted to the first transmission ratio, so that the output head 100 at the working position performs an output at the second constant rotation speed.

It needs to be noted that a movement manner of the shift position adjustment member 150 may be, but not limited to, a swipe manner, a rotation manner, a pressing manner, or the like.

Figure 13:
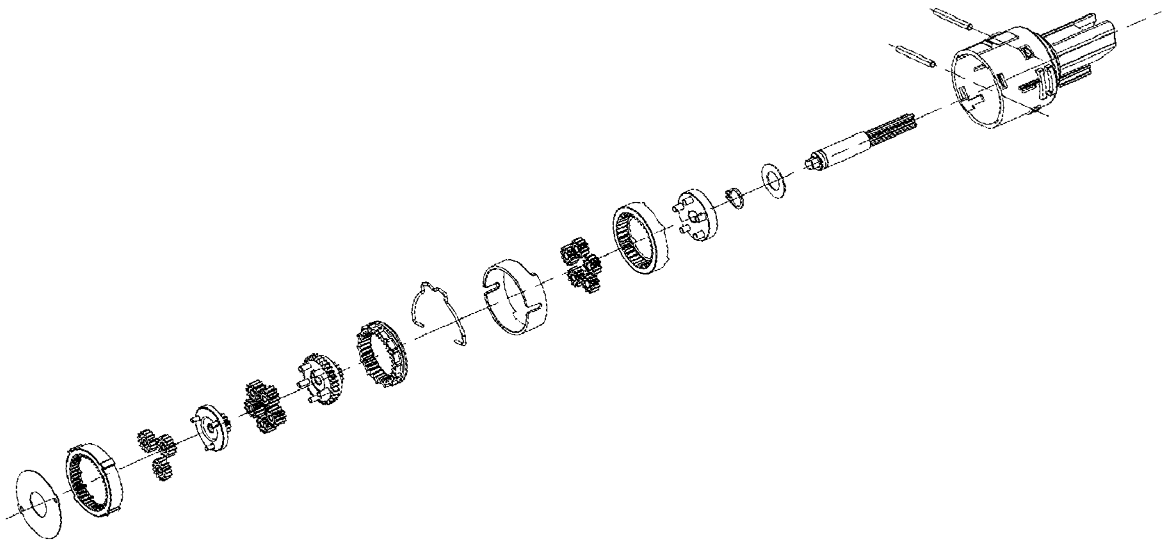
FIG. 13 is a schematic structural exploded view of a reducer in an embodiment.
Figure 14:
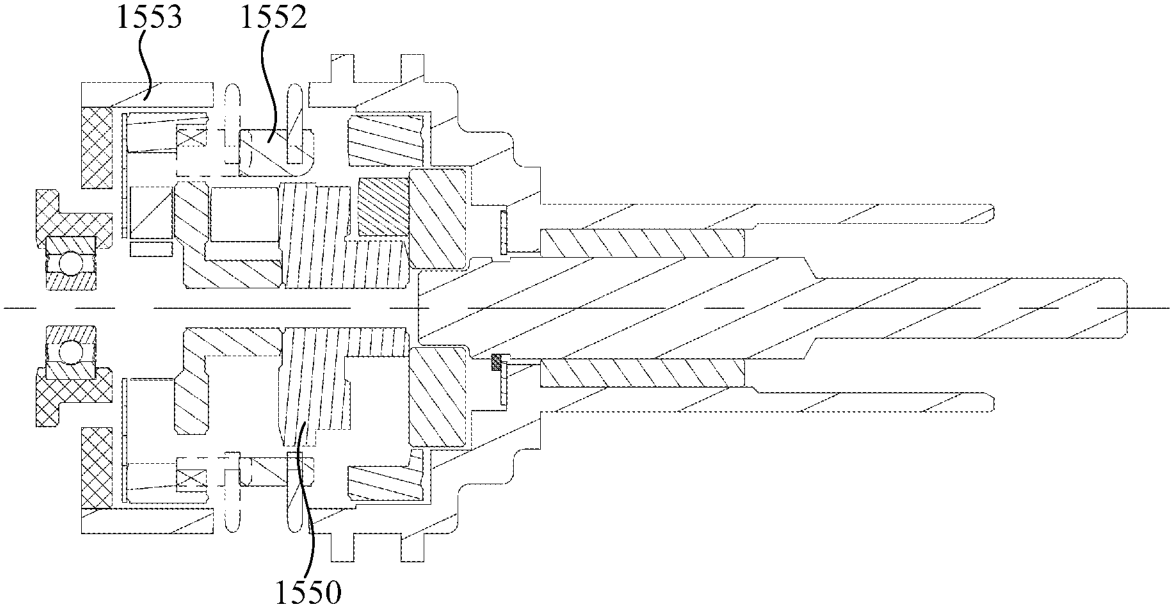
FIG. 14 is a schematic structural cross-sectional view of a reducer in an embodiment.

Further, referring to FIG. 13 and FIG. 14, the gear transmission mechanism 155 includes a sun gear 1550, a first planetary gear 1551 mounted on the sun gear 1550, and a speed adjustment ring gear 1552 sleeved on the first planetary gear 1551. The speed adjustment ring gear 1552 has a first position and a second position in an axial direction of the sun gear 1550. When the speed adjustment ring gear 1552 is located at the first position, the speed adjustment ring gear 1552 is simultaneously engaged with the sun gear 1550 and the first planetary gear 1551. When the speed adjustment ring gear 1552 is located at the second position, the speed adjustment ring gear 1552 is engaged with the first planetary gear 1551, and is detached from the sun gear 1550. The adjustment member is in transmission fit with the speed adjustment ring gear 1552. In this way, in an adjustment process, when the speed adjustment ring gear 1552 is located at the first position, the speed adjustment ring gear 1552 is simultaneously engaged with a gear disk of the sun gear 1550 and the first planetary gear 1551. In this case, rotation of the motor 15 is directly transferred to the sun gear 1550 through the speed adjustment ring gear 1552 (that is, the speed adjustment ring gear 1552 is in a rotatable state). When the speed adjustment ring gear 1552 is located on the second position, the speed adjustment ring gear 1552 is disengaged from the sun gear 1550 (that is, the speed adjustment ring gear 1552 is limited by a reduction box 1553 and is in a non-rotatable state). In this case, the rotation of the motor 15 can only be transferred to the first planetary gear 1551, so that the first planetary gear 1551 revolves in the speed adjustment ring gear 1552, to drive the sun gear 1550 to spin. In this way, an output power of the motor 15 decreases, to implement a reduction effect.

It needs to be noted that, the gear transmission mechanism 155 in this embodiment may be formed by a multi-level planetary gear assembly. In addition, in a reduction process, a two-level reduction effect, a three-level reduction effect, a more-level reduction effect, or the like may be implemented.

Furthermore, referring to FIG. 13, the gear transmission mechanism 155 further includes the reduction box 1553 and a first planetary carrier 1554, a second planetary gear 1555, a first inner ring gear 1556, a second planetary carrier 1557, a third planetary gear 1558, and a second inner ring gear 1559 that are disposed in the reduction box 1553. The first inner ring gear 1556 is sleeved on and engaged with the second planetary gear 1555. The first inner ring gear 1556 is in a fixed state relative to the reduction box 1553. The second planetary gear 1555 is mounted on the first planetary carrier 1554. An output shaft 130 of the first planetary carrier 1554 is engaged with the first planetary gear 1551. The second inner ring gear 1559 is sleeved on and engaged with the third planetary gear 1558. The second inner ring gear 1559 is in a fixed state relative to the reduction box 1553. The third planetary gear 1558 is mounted on the second planetary carrier 1557. The second planetary carrier 1557 is in transmission connection with the output shaft 130.

In an embodiment, referring to FIG. 1, a chute 112 is provided in the housing 12. The shift position adjustment member 150 is located in the chute 112, and is in transmission fit with the speed adjustment ring gear 1552. The shift position adjustment member 150 can reciprocate in the chute 112 in an axial direction of the output shaft 130. In this way, when needing to adjust an output rotation speed of the power tool 10, an operator only needs to toggle the shift position adjustment member 150 back and forth.

In an embodiment, referring to FIG. 1, the control apparatus further includes a detection apparatus 170 used for detecting the shift position adjustment member 150. The detection apparatus 170 is electrically connected to the controller 400. When the shift position adjustment member 150 is at the first position, the detection apparatus 170 sends a first detection signal. When the shift position adjustment member 150 is at the second position, the detection apparatus 170 sends a second detection signal. The first detection signal is different from the second detection signal. That is, a specific position of the shift position adjustment member 150 may be accurately recognized through the detection apparatus 170, so that the control apparatus can correspondingly adjust the output torque of the motor 15.

It needs to be noted that the detection apparatus 170 is a device that can detect the shift position adjustment member 150 at the first position or the second position and can send an electrical signal sufficient for recognition to the controller 400. For example, the detection apparatus 170 may be a Hall sensor and two magnets with magnetic poles arranged oppositely; or may be another sensing device, for example, a pressure-sensitive sensing device, a light-sensitive sensing device, or the like. This is not specifically limited in this embodiment, provided that the shift position adjustment member 150 at the first position or the second position can be detected and the first detection signal and the second detection signal can be sent.

Further, when the power tool 10 is in the drill mode, the controller 400 controls the motor 15 according to the first detection signal to output a first constant torque, and controls the motor 15 according to the second detection signal to output a second constant torque. The first constant torque is different from the second constant torque. When the power tool 10 is in the screwdriver mode, the controller 400 controls the output torque of the motor 15 according to the first detection signal to be adjustable in a first preset range, and controls the output torque of the motor 15 according to the second detection signal to be adjustable a second preset range. The first preset range is different from the second preset range.

As can be learned, while the shift position adjustment member 150 adjusts the transmission ratio of the gear transmission mechanism 155, the output torque of the motor 15 is also synchronously changed correspondingly. When the power tool 10 is in the drill mode, while the shift position adjustment member 150 moves between the first position and the second position to change the transmission ratio of the gear transmission mechanism 155, the detection apparatus 170 sends a corresponding detection signal (that is, the first detection signal and the second detection signal) to the controller 400. In this case, the controller 400 controls the motor 15 to output a corresponding constant torque (that is, the first constant torque and the second constant torque), to ensure that the output head 100 at the working position can output different rotation speeds.

Similar, when the power tool 10 is in the screwdriver mode, while the shift position adjustment member 150 moves between the first position and the second position to change the transmission ratio of the gear transmission mechanism 155, the detection apparatus 170 sends a corresponding detection signal (that is, the first detection signal and the second detection signal) to the controller 400. In this case, the controller 400 controls the output torque of the motor 15 to be adjustable in a corresponding preset range (that is, the first preset range and the second preset range), to ensure that a rotation speed of the output head 100 at the working position adjusts an output in a corresponding range.

It needs to be noted that there are various types of output head detection assemblies 200, provided that during alternate switching of the output heads 100, a working mode of the power tool 10 can be simultaneously changed through the output head detection assembly 200.

It needs to be further noted that, to improve recognition precision of a signal, a Hall sensor is used as an example. A magnet may be disposed in a position region corresponding to each output head 100, and magnetic poles of two adjacent magnets are disposed oppositely. In other words, the north pole of one magnet faces upward, and the south pole of the other magnet faces upward. When different output heads 100 are switched to the working position, the Hall sensor can obtain different sensing signals, to enable the power tool 10 to be in a corresponding working mode.

In an embodiment, referring to FIG. 3, the power tool 10 further includes an operation mechanism 20. The operation mechanism 20 is used for controlling the working assembly 120 to be locked to or released from the housing 12. In this way, when one of the output heads 100 rotates to the working position, the operation mechanism 20 enables the output head 100 to be mated to the output shaft 130 and locked to the housing 12, so that the motor 15 transfers a power to the output head 100. When the output head 100 needs to be changed, the operation mechanism 20 is used again, to mate the current output head 100 and the output shaft 130 and unlock the output head from the housing 12.

Figure 2B:
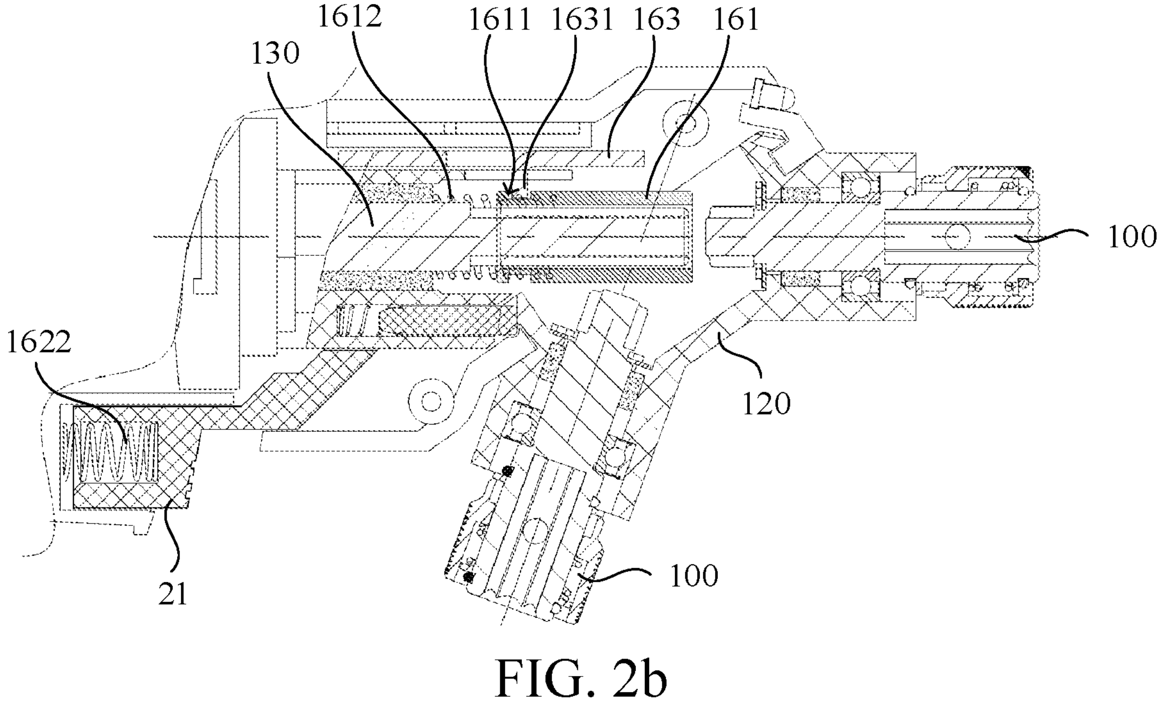
FIG. 2*b* is a structural cross-sectional view of a power tool during unmating in an embodiment.
Figure 2C:
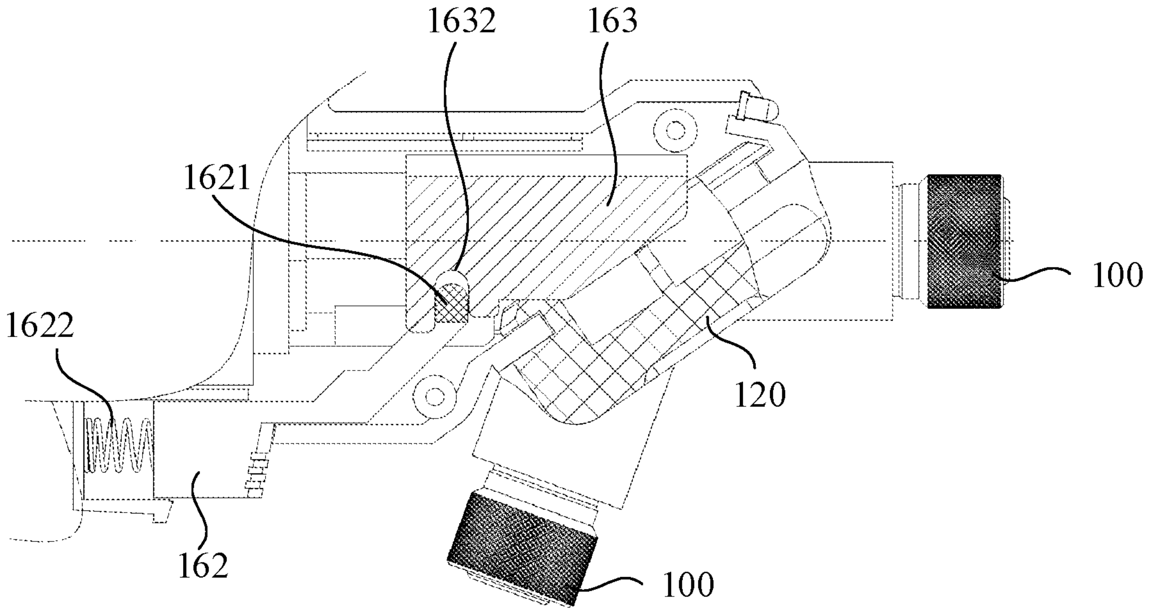
FIG. 2*c* is a schematic enlarged view of a partial structure of the power tool in FIG. 2*a;*
Figure 2D:
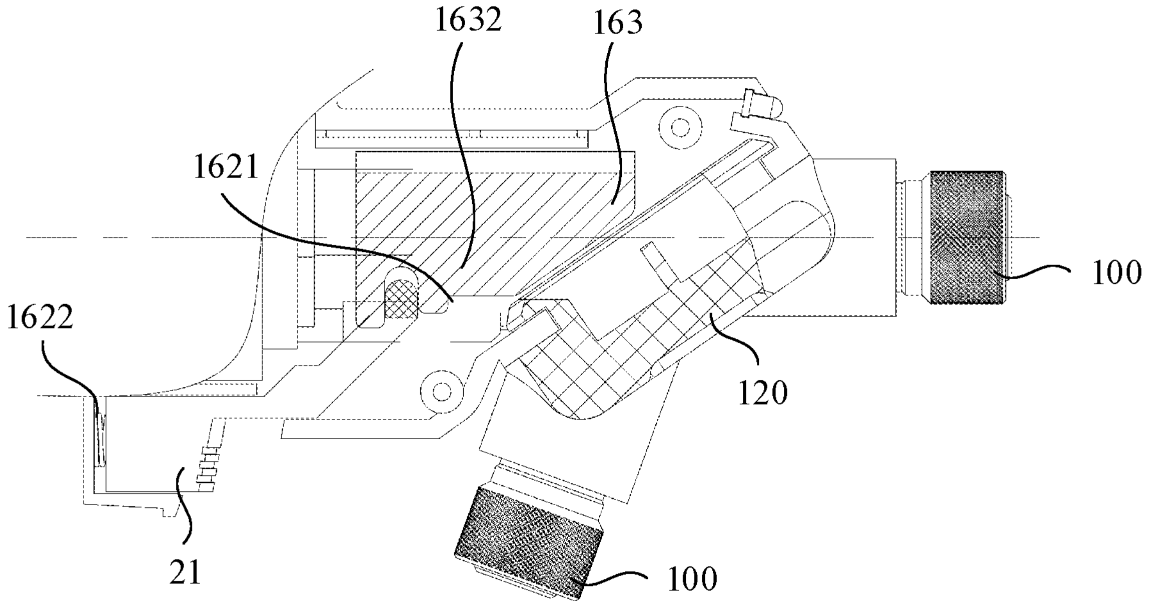
FIG. 2*d* is a schematic enlarged view of a partial structure of the power tool in FIG. 2*b;*

Further, referring to FIG. 2*a* to FIG. 2*d*, the operation mechanism 20 includes an operation button 21 and a clutch sleeve 161 linked to the operation button 21. The clutch sleeve 161 is sleeved on the output shaft 130. The operation button 21 is movably disposed on the housing 12. When the operation button 21 moves, the clutch sleeve 161 can be driven to move in axial direction of the output shaft 130, to mate the clutch sleeve 161 to a working shaft of the output head 100 and at the same time lock the working assembly 120 relative to the housing 12, or unmate the clutch sleeve 161 from the working shaft of the output head 100 and at the same time unlock the working assembly 120 relative to the housing 12. Referring to FIG. 2*a* and FIG. 2*c*, when an operator needs to change the output head 100, the operation button 21 is triggered to move, to drive the clutch sleeve 161 to move away from the working assembly 120 in an axial direction of the output shaft 130, to unmate the clutch sleeve from the output head 100 and at the same time unlock the working assembly 120 and the housing 12. In this case, the operator may switch the required output head 100 to the working position. Referring to FIG. 2*b* and FIG. 2*d*, after the switching, the operation button 21 is released or reversely triggered, so that the clutch sleeve 161 moves toward the working assembly 120 in the axial direction of the output shaft 130, to mate the clutch sleeve 161 to the required output head 100 and lock the working assembly 120 to the housing 12. The locking or unlocking of the working assembly 120 and the housing 12 may be implemented by using a fastener. For example, an elastic hook structure is disposed on the working assembly 120, and a clamping groove structure or the like is provided in the housing 12.

It needs to be noted that, the operation button 21 may be directly connected to the clutch sleeve 161, to form an overall structure. In this case, when the operation button 21 moves, the clutch sleeve 161 is directly driven to move together. Certainly, the operation button 21 may be indirectly connected to the clutch sleeve 161. In other words, an intermediate structure is used between the operation button 21 and the clutch sleeve 161 for transmission. In addition, the clutch sleeve 161 in this embodiment has a cylindrical structure.

Optionally, a movement manner of the operation button 21 on the housing 12 may be a spin manner, a swipe manner, a rotation manner, a pressing manner, or the like.

In an embodiment, referring to FIG. 2*c* and FIG. 2*d*, the operation mechanism 20 further includes a transmission member 163 located in the housing 12. The operation button 21 is in transmission connection with the clutch sleeve 161 through the transmission member 163. In other words, transmission between the operation button 21 and the clutch sleeve 161 is indirect transmission. In this way, through the transmission member 163, the clutch sleeve 161 better moves under the action of the operation button 21.

Further, referring to FIG. 2*b*, a first buckle 1611 is disposed on the clutch sleeve 161. A second buckle 1631 in fastener combination with the first buckle 1611 is disposed on the transmission member 163.

Optionally, the first buckle 1611 has a slot or hole-shaped structure, and the second buckle 1631 has a convex-shaped structure; or the first buckle 1611 has a convex-shaped structure, and the second buckle 1631 has a slot or hole-shaped structure.

In an embodiment, referring to FIG. 2*d*, the operation button 21 is rotatably mounted on the housing 12, and a third buckle 1621 is disposed on the operation button 21. A fourth buckle 1632 in fastener combination with the third buckle 1621 is disposed on the transmission member 163.

Optionally, the third buckle 1621 has a slot or hole-shaped structure, and the fourth buckle 1632 has a convex-shaped structure; or the third buckle 1621 has a convex-shaped structure, and the fourth buckle 1632 has a slot or hole-shaped structure.

In an embodiment, referring to FIG. 2*b*, the operation mechanism 20 further includes a first reset member 1622. The first reset member 1622 is disposed between the operation button 21 and the housing 12. The first reset member 1622 is used for restoring the operation button 21 to an initial position. In this way, after the operation button 21 moves to contact the mating between the clutch sleeve 161 and the output head 100, the operation button 21 is released, so that the operation button 21 is restored to the initial position under the action of the first reset member 1622, to drive the clutch sleeve 161 to be synchronously restored to the initial position.

Optionally, the first reset member 1622 may be a spring, elastic rubber, an elastic metal sheet, or the like.

Specifically, referring to FIG. 2*b*, the first reset member 1622 is a first spring.

Similarly, in another embodiment, referring to FIG. 2*b*, the operation mechanism 20 further includes a second reset member 1612. The second reset member 1612 is disposed between the clutch sleeve 161 and the output shaft 130. The second reset member 1612 is used for restoring the clutch sleeve 161 to an initial position. In this way, when the operation button 21 is released, the clutch sleeve 161 is restored to the initial position under the action of the second reset member 1612.

Optionally, the second reset member 1612 may be a spring, elastic rubber, an elastic metal sheet, or the like.

Specifically, referring to FIG. 2*d*, the second reset member 1612 is a second spring. The second spring is sleeved on the output shaft 130, and is connected to or abuts against the clutch sleeve 161.

In an embodiment, the power tool 10 further includes a control switch electrically connected to the controller 400, to implement start and stop control of the power tool 10. To facilitate understanding of a control principle of a circuit in the power tool 10 in this embodiment, refer to FIG. 11.

In an embodiment, referring to FIG. 2*a*, the working assembly 120 further includes a spinning body rotatably disposed on the housing 12. The spinning body has a rotation axis, and the spinning body rotates around the rotation axis on the housing 12. At least two output heads 100 are disposed on the spinning body at intervals. The at least two output heads 100 are symmetrically disposed with respect to the rotation axis.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present application, which are described specifically and in detail, but cannot be construed as a limitation to the patent scope of the present application. It should be noted that for persons of ordinary skill in the art, several transformations and improvements can be made without departing from the idea of the present application. These transformations and improvements belong to the protection scope of the present application. Therefore, the protection scope of the patent of the present application shall be subject to the appended claims.

What is claimed is:

1. A power tool comprising:
at least two output heads including a first output head and a second output head, respectively located at a working position or a non-working position;
an output head detection assembly configured to detect a respective output head at the working position, and generate a respective detection signal, different output heads located at the working position corresponding to different detection signals, the first output head corresponding to a first detection signal, the second output head corresponding a second detection signal;
a function switching unit configured to generate, in response to external triggering, a mode switching signal used for indicating to switch a working mode of the respective output head at the working position; and
a controller connected to the output head detection assembly and the function switching unit and configured to:
read a prestored working association state of the first output head at the working position based on the first detection signal, wherein the prestored working association state is used for representing a respective association relationship between the respective output head and a respective working mode, the respective association relationship including a first association relationship that the first output head corresponds to a first mode initially;
switch the working mode of the first output head at the working position from the first mode to a second mode in response to the mode switching signal; and
based on the working mode being switched, update the first association relationship to a second association relationship that the first output head corresponds to the second mode, and store the second association relationship.

2. The power tool according to claim 1, wherein the output head detection assembly comprises a detection element, and the detection element comprises a Hall sensor, a light sensor or a proximity sensor.

3. The power tool according to claim 1, wherein the function switching unit is further configured to generate, in response to external triggering, a torque switching signal used for indicating to switch a working torque of the respective output head at the working position, and the controller is configured to switch the working torque of the respective output head at the working position in response to the torque switching signal.

4. The power tool according to claim 1, wherein the function switching unit comprises a first switching region and a second switching region, and the first switching region and the second switching region respectively correspond to the first mode and the second mode.

5. The power tool according to claim 1, wherein the function switching unit further comprises an indicator lamp corresponding to working modes, and the indicator lamp is used for indicating the working mode of a current output head at the working position.

6. The power tool according to claim 1, wherein the controller is further used for reading the prestored working association state after the power tool is powered up.

7. The power tool according to claim 1, wherein the controller further obtains a current detection signal and the working mode of a current output head at the working position in response to stopping of the power tool.

8. The power tool according to claim 1, wherein the working mode comprises a screwdriver mode and a drill mode.

9. A control method of a power tool including at least two output heads including a first output head and a second output head, the control method comprising:
detecting the first output head at a working position in response to detecting a first detection signal at the working position, the first output head corresponding to the first detection signal, the second output head corresponding to a second detection signal;
reading a prestored working association state of the first output head, wherein the prestored working association state is used for representing a respective association relationship between a respective detection signal and a respective working mode, the respective association relationship including a first association relationship that the first output head corresponds to a first mode initially;
generating, in response to external triggering, a mode switching signal used for indicating to switch the first mode of the first output head at the working position to a second mode;
switching the first mode of the first output head at the working position to the second mode in response to the mode switching signal;
updating the first association relationship to a second association relationship that the first output head corresponds to the second mode; and
storing the second association relationship.

10. The control method according to claim 9, further comprising:
in response to a power-up being detected, reading the prestored working association state;
determining a first mode of the first output head at the working position according to a first detection signal and the prestored working association state; switching the first mode of the first output head to a second mode at the working position in response to the mode switching signal;

associating the first detection signal with the second mode after switching; and updating the prestored working association state.

11. The control method according to claim 9, wherein the control method further comprises: controlling an indicator lamp to be turned on, to indicate a respective working mode of a respective output head at the working position.

12. The control method according to claim 10, wherein the control method further comprises:

in response to determining that the power tool stops, determining a current detection signal and a corresponding working mode of a corresponding output head at the working position.

13. The control method according to claim 9, wherein the control method further comprises: in response to determining that the first mode of the first output head at the working position is the first mode, and detecting a torque switching signal corresponding to the first mode, controlling to switch a working torque of the first output head at the working position.

14. The control method according to claim 9, wherein the control method further comprises: in response to determining that the first mode of the first output head at the working position is the first mode, controlling a display region to be turned on, to indicate a working torque of the first output head at the working position.

15. The control method according to claim 9, wherein the control method further comprises:

in response to determining that the power tool stops, storing a working torque in a first mode.

16. A power tool comprising:

a housing comprising a main housing extending along a longitudinal axis and a handle housing at an angle with respect to the main housing, wherein a position opposite to a connecting position between the main housing and the handle housing is defined as a top of the main housing;

a motor disposed in the main housing;

a switch trigger disposed at the handle housing and configured to control start and stop of the motor;

an output shaft driven by the motor to rotate;

a working assembly comprises a first output head and a second output head, the first output head and the second output head being selectively mated to the output shaft; and a function switching unit and a controller electrically connected to the function switching unit, wherein:

the function switching unit is disposed at the top of the main housing and is configured to generate a mode switching signal in response to external triggering;

the controller reads a prestored working association state of the first output head at a working position, the prestored working association state including a first association relationship that the first output head corresponds to a drill mode initially, the first output head mated to the output shaft outputting a constant torque at the drill mode;

the controller switches, according to the mode switching signal, a working mode of the first output head to a screwdriver mode, an output torque of the first output head mated to the output shaft being adjustable in a preset range at the screwdriver mode; and the controller, based on the working mode being switched, updates the first association relationship to a second association relationship that the first output head corresponds to the screwdriver mode, and stores the second association relationship.

17. The power tool according to claim 16, wherein the function switching unit comprises a button, and the button is used for operably switching the working mode of the power tool between the drill mode and the screwdriver mode.

18. The power tool according to claim 16, wherein the power tool further comprises a torque adjustment member electrically connected to the controller; the function switching unit comprises a first button, and the first button is used for operably switching the working mode of the power tool to the screwdriver mode; and in the screwdriver mode, the first button is further used as the torque adjustment member for adjusting the output torque of the first output head or the second output head that is selectively mated to the output shaft;

wherein the function switching unit further comprises a second button, and the second button is used for operably switching the working mode of the power tool to the drill mode; and the first button and the second button are disposed in parallel.

19. The power tool according to claim 1, wherein:

the respective association relationship includes a third association relationship includes that the second output head corresponds to the second mode initially, wherein the controller is configured to:

in response to the mode switching signal for switching the working mode of the first output head, update the third association relationship to a fourth association relationship that the second output head corresponds to the first mode, and store the fourth association relationship.

20. The control method according to claim 9, wherein:

the respective association relationship includes a third association relationship includes that the second output head corresponds to the second mode initially; and the control method further comprises:

in response to the mode switching signal for switching a working mode of the first output head, updating the third association relationship to a fourth association relationship that the second output head corresponds to the first mode, and storing the fourth association relationship.

* * * * *